(12) United States Patent
Morimura

(10) Patent No.: US 12,151,712 B2
(45) Date of Patent: Nov. 26, 2024

(54) VEHICLE CONTROL DEVICE, VEHICLE CONTROL METHOD, AND NON-TRANSITORY COMPUTER READABLE MEDIUM

(71) Applicant: PANASONIC INTELLECTUAL PROPERTY MANAGEMENT CO., LTD., Osaka (JP)

(72) Inventor: Kazuo Morimura, Kanagawa (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 464 days.

(21) Appl. No.: 17/400,269

(22) Filed: Aug. 12, 2021

(65) Prior Publication Data
US 2021/0370989 A1    Dec. 2, 2021

Related U.S. Application Data

(63) Continuation of application No. PCT/JP2020/005416, filed on Feb. 12, 2020.

(30) Foreign Application Priority Data

Feb. 14, 2019 (JP) ................. 2019-024569

(51) Int. Cl.
*B60W 60/00* (2020.01)
*B60P 3/00* (2006.01)
(Continued)

(52) U.S. Cl.
CPC ....... *B60W 60/00256* (2020.02); *B60P 3/007* (2013.01); *G01C 21/343* (2013.01);
(Continued)

(58) Field of Classification Search
CPC ............ B60W 60/00256; B60P 3/007; G01C 21/343; G05D 1/0217; G05D 1/0274;
(Continued)

(56) References Cited

U.S. PATENT DOCUMENTS 11,283,877 B2* 3/2022 Kentley-Klay ........ B60Q 1/549
2017/0291766 A1* 10/2017 Orth .................. G06Q 10/0832
(Continued)

FOREIGN PATENT DOCUMENTS

CN    102999821    3/2013
CN    107392547    11/2017
(Continued)

OTHER PUBLICATIONS

International Search Report (ISR) from International Searching Authority (Japan Patent Office) in International Pat. Appl. No. PCT/JP2020/005416, dated Apr. 21, 2020, together with an English language translation.
(Continued)

*Primary Examiner* — Anne Marie Antonucci
*Assistant Examiner* — Lidia Kwiatkowska
(74) *Attorney, Agent, or Firm* — Greenblum and Bernstein, P.L.C.

(57) ABSTRACT

A vehicle control device configured to perform control related to pickup and delivery by a vehicle. The vehicle is movable forward bi-directionally and includes package compartments on first and second sides. The vehicle control device is configured to perform operations including: acquiring position information of a target user point; acquiring position information of a target package compartment for storing a package to be delivered or picked up with respect to an advancing direction in which the vehicle travels toward the target user point; and outputting an instruction to reverse the advancing direction of the vehicle to a vehicle controller configured to perform traveling control of the vehicle in a case where a side of a side surface where the target package compartment is positioned and a side of the target user point with respect to the advancing direction of the vehicle do not coincide with each other.

19 Claims, 14 Drawing Sheets

(51) Int. Cl.
*G01C 21/34* (2006.01)
*G05D 1/00* (2024.01)
*G06Q 10/0835* (2023.01)

(52) U.S. Cl.
CPC ......... *G05D 1/0217* (2013.01); *G05D 1/0274* (2013.01); *G06Q 10/08355* (2013.01)

(58) Field of Classification Search
CPC ......... G05D 2201/0213; G05D 1/0297; G06Q 10/08355; G06Q 10/08; B65G 61/00; G08G 1/00; G08G 1/137
See application file for complete search history.

(56) References Cited

U.S. PATENT DOCUMENTS

| | | | |
|---|---|---|---|
| 2018/0024554 A1* | 1/2018 | Brady | G06Q 10/0833 701/23 |
| 2018/0165782 A1 | 6/2018 | Ibe | |
| 2018/0217598 A1 | 8/2018 | Kuhara | |
| 2018/0314988 A1 | 11/2018 | Harada | |
| 2019/0026886 A1* | 1/2019 | Ferguson | G08G 1/148 |
| 2019/0220811 A1* | 7/2019 | Naito | G06Q 10/08355 |
| 2021/0373569 A1* | 12/2021 | Tazume | G06V 20/56 |

FOREIGN PATENT DOCUMENTS

| | | |
|---|---|---|
| CN | 107848720 | 3/2018 |
| CN | 108352047 | 7/2018 |
| CN | 109064082 | 12/2018 |
| DE | 102016106456 | 10/2017 |
| DE | 102016217717 | 3/2018 |
| DE | 112017002861 | 2/2019 |
| EP | 2299417 | 3/2011 |
| JP | 2002-265062 | 9/2002 |
| JP | 2002-312884 | 10/2002 |
| JP | 2018-124676 | 8/2018 |
| WO | 2009/142175 | 11/2009 |
| WO | 2018/004425 | 1/2018 |

OTHER PUBLICATIONS

Written Opinion (WO) from International Searching Authority (Japan Patent Office) in International Pat. Appl. No. PCT/JP2020/005416, dated Apr. 21, 2020, together with an English language translation.

Office Action from China National Intellectual Property Administration (CNIPA) in Chinese Patent Application No. 202080013961.X, dated Jul. 13, 2022, together with an English language translation.

Office Action issued by the German Patent and Trademark Office in German Patent Appl. No. 112020000820.7, dated Jul. 11, 2024, together with an English language translation.

* cited by examiner

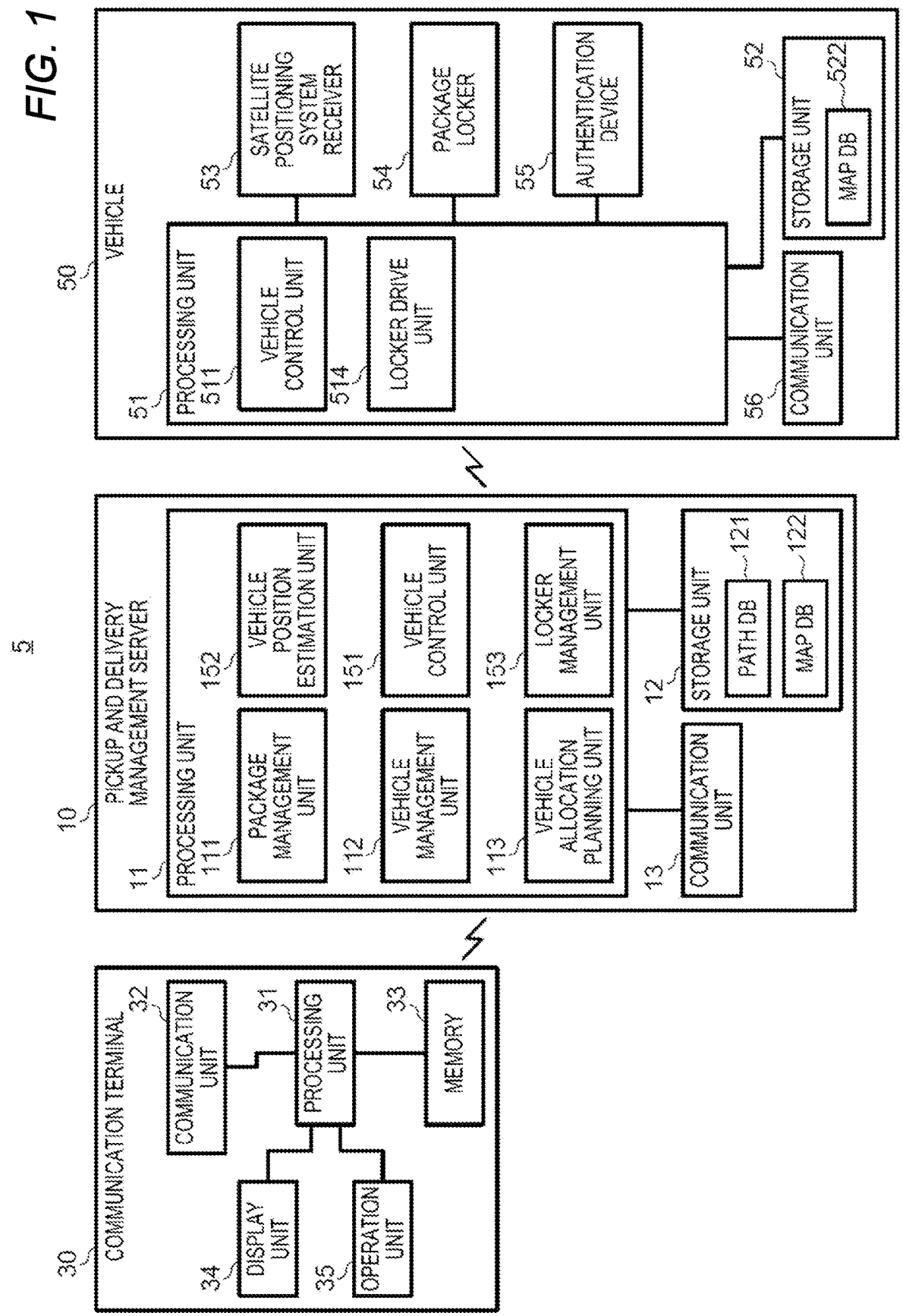

VEHICLE CONTROL DEVICE, VEHICLE CONTROL METHOD, AND NON-TRANSITORY COMPUTER READABLE MEDIUM

CROSS-REFERENCE TO RELATED APPLICATIONS

This application is a continuation of PCT International Patent Application No. PCT/JP2020/005416 filed on Feb. 12, 2020, which claims the benefit of priority of Japanese Patent Application No. 2019-024569 filed on Feb. 14, 2019, the entire contents of which are incorporated herein by reference.

FIELD

The present disclosure relates to a vehicle control device, a vehicle control method, and a non-transitory computer readable medium for controlling a vehicle that picks up and delivers a package.

BACKGROUND

A delivery system that delivers a package by an autonomous driving vehicle has been proposed. JP-A-2018-124676 discloses a management device and a delivery support method that determine whether parking or stopping of a vehicle in a delivery destination area is possible and notify whether delivery by the autonomous driving vehicle is possible are disclosed. The management device has a configuration in which delivery destination information is received from a customer terminal, a delivery destination area is determined based on the delivery destination information, whether parking or stopping of a vehicle is prohibited in the delivery destination area is determined, and notification information indicating whether delivery is possible is transmitted to the customer terminal. Accordingly, when a customer designates a delivery method by an autonomous driving vehicle, it is possible to check whether the delivery by the autonomous driving vehicle is possible.

SUMMARY

An object of the present disclosure is to provide a vehicle control device, a vehicle control method, and a non-transitory computer readable medium that can position a target package compartment on a side close to a user in delivery or pickup of a package.

As an aspect, the present disclosure provides a vehicle control device configured to perform control related to pickup and delivery by a vehicle, the vehicle being configured to be movable forward bi-directionally and including a package compartment on a first side where an opening portion of the package compartment faces a first side surface of the vehicle, and a package compartment on a second side where an opening portion faces a second side surface opposite to the first side surface, the vehicle control device including: a processor; and a memory having instructions, when executed by the processor, to cause the vehicle control device to perform operations, the operations including: acquiring position information of a target user point designated by a user who requests delivery or pickup; acquiring position information of a target package compartment for storing a package to be delivered or picked up with respect to an advancing direction in which the vehicle travels toward the target user point; and outputting an instruction to reverse the advancing direction of the vehicle to a vehicle controller configured to perform traveling control of the vehicle in a case where a side of a side surface where the target package compartment is positioned and a side of the target user point with respect to the advancing direction of the vehicle do not coincide with each other.

As an aspect, the present disclosure provides a vehicle configured to be movable forward bi-directionally, the vehicle including: a package compartment on a first side where an opening portion of the package compartment faces a first side surface of the vehicle; a package compartment on a second side where an opening portion faces a second side surface opposite to the first side surface; a processor; a memory having instructions; and a vehicle controller configured to perform traveling control of the vehicle, wherein the instructions, when executed by the processor, cause the vehicle to perform operations, the operations including: acquiring position information of a target user point designated by a user who requests delivery or pickup; acquiring position information of a target package compartment for storing the package to be delivered or picked up with respect to an advancing direction in which the vehicle travels toward the target user point; and outputting an instruction to reverse the advancing direction of the vehicle to the vehicle controller in a case where a side of a side surface where the target package compartment is positioned and a side of the target user point with respect to the advancing direction of the vehicle do not coincide with each other.

As an aspect, the present disclosure provides a vehicle control method for performing control related to pickup and delivery by a vehicle, the vehicle being configured to be movable forward bi-directionally and including a package compartment on a first side where an opening portion of the package compartment faces a first side surface of the vehicle, and a package compartment on a second side where an opening portion faces a second side surface on a side opposite to the first side surface, the vehicle control method including: acquiring position information of a target user point designated by a user who requests delivery or pickup; acquiring position information of a target package compartment for storing a package to be delivered or picked up with respect to an advancing direction in which the vehicle travels toward the target user point; and outputting an instruction to reverse the advancing direction of the vehicle to a vehicle controller configured to perform traveling control of the vehicle in a case where a side of a side surface where the target package compartment is positioned and a side of the target user point with respect to the advancing direction of the vehicle do not coincide with each other.

As an aspect, the present disclosure provides a non-transitory computer readable medium storing a program for causing a computer to execute a vehicle control method for performing control related to pickup and delivery by a vehicle, the vehicle being configured to be movable forward bi-directionally and including a package compartment on a first side where an opening portion of the package compartment faces a first side surface of the vehicle, and a package compartment on a second side where an opening portion faces a second side surface on a side opposite to the first side surface, the vehicle control method including: acquiring position information of a target user point designated by a user who requests delivery or pickup; acquiring position information of a target package compartment for storing a package to be delivered or picked up with respect to an advancing direction in which the vehicle travels toward the target user point; and outputting an instruction to reverse the advancing direction of the vehicle to a vehicle controller configured to perform traveling control of the vehicle in a case where a side of a side surface where the target package compartment is positioned and a side of the target user point with respect to the advancing direction of the vehicle do not coincide with each other.

According to the present disclosure, it is possible to position a target package compartment on a side close to a user in delivery or pickup of a package.

BRIEF DESCRIPTION OF DRAWINGS

FIG. 1 is a block diagram showing an example of a configuration of a pickup and delivery system according to a first embodiment.

FIG. 2A is a perspective view seen from one side surface, FIG. 2B is a side view showing the other side surface, and FIG. 2C is a plan view seen through from above.

DETAILED DESCRIPTION

Figure 2A:
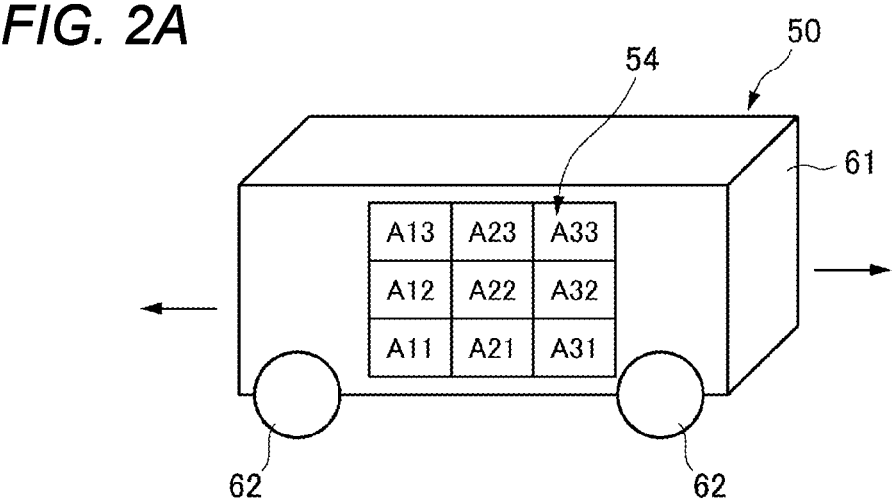
FIGS. 2A to 2C are schematic views showing a configuration example of a vehicle and a package locker portion according to the embodiment.

Hereinafter, embodiments specifically disclosing a vehicle control device, a vehicle control method, and a program according to the present disclosure will be described in detail with reference to the accompanying drawings as appropriate. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure for those skilled in the art, and are not intended to limit the subject matter recited in the claims.

In the following embodiments, specific examples of the vehicle control device, the vehicle control method, and the program according to the present disclosure will be described using an example of a pickup and delivery system that delivers or picks up a package. In the present embodiment, it is assumed that delivery or pickup is performed using an autonomous driving vehicle as a vehicle.

First Embodiment

FIG. 1 is a block diagram showing an example of a configuration of a pickup and delivery system according to a first embodiment. A pickup and delivery system 5 supports a service of delivering or picking up a package of an individual or a corporation at a predetermined place by a vehicle 50, and includes a pickup and delivery management server 10, a communication terminal 30, and the vehicle 50. Although a case where the vehicle 50 is an unmanned autonomous driving vehicle on which no driver is riding is mainly exemplified, the vehicle 50 is similarly applicable to an autonomous driving vehicle on which a driver is riding, a normal automobile driven by a driver, or the like.

In the first embodiment, a case where the pickup and delivery management server 10 has a function of a vehicle control device and the pickup and delivery management server 10 mainly manages and controls operation of the vehicle 50 will be described as an example.

The pickup and delivery management server 10 is managed by an organization such as a company that operates a pickup and delivery system that delivers or picks up a package, and functions are realized by a server device on a network, a management computer disposed in a base such as a pickup and delivery center, or the like. The pickup and delivery management server 10 functions as a server device that performs management of delivery or pickup of a package and management of operation of the vehicle 50.

The pickup and delivery management server 10 includes a processing unit 11, a storage unit 12, and a communication unit 13. The processing unit 11 includes a processor, and realizes various functions, for example, by the processor executing a predetermined program stored in the storage unit 12. The processor may include a micro processing unit (MPU), a central processing unit (CPU), a digital signal processor (DSP), a graphical processing unit (GPU), and the like.

The processing unit 11 has a function of providing an instruction on traveling of the vehicle 50, and includes, as functional configurations, a package management unit 111, a vehicle management unit 112, a vehicle allocation planning unit 113, a vehicle control unit 151, a vehicle position estimation unit 152, and a locker management unit 153. The package management unit 111, the vehicle management unit 112, the vehicle allocation planning unit 113, the vehicle control unit 151, the vehicle position estimation unit 152, and the locker management unit 153 are functions obtained by the processor executing a predetermined program.

The storage unit 12 stores the program executed by the processor of the processing unit 11, and includes a path database (path DB) 121 and a map database (map DB) 122 in addition to being used as a working memory. The storage unit 12 includes a primary storage device (for example, a random access memory (RAM) or a read only memory (ROM)). The storage unit may include a secondary storage device (for example, a hard disk drive (HDD) or a solid state drive (SSD)) or a tertiary storage device (for example, an optical disk or an SD card).

The path database 121 stores path data. The path data includes information such as a point of a delivery destination or a pickup destination, a traffic direction (bidirectional, one-way, or the like) of a road serving as a path of delivery or pickup, a reversing point at which the vehicle is reversed, and a movement cost between optional (for example, adjacent) two points. Examples of the movement cost include a distance between two points that are delivery destinations of a pickup and delivery route, a time required for movement, or an amount of energy required for movement (for example, an amount of electricity and an amount of gasoline). The reversing point of the vehicle is an area where an advancing direction in which the vehicle 50 travels can be reversed, and includes position information of a point having a vehicle reversing space present in a path of a pickup and delivery route or in the vicinity of a delivery position or a pickup position. As the reversing point of the vehicle, for example, a charging station, a parking lot, a vehicle turning space, or the like is used. Here, when targeting a vehicle that can move forward bi-directionally, reversing the vehicle does not mean reversing an orientation of the vehicle, but corresponds to switching an advancing direction of the vehicle. Such inversion is called, for example, "switchback". Further, in a case where a point not registered in the path database 121, for example, a new customer is a delivery destination, the processing unit 11 may acquire a position of the delivery destination of the new customer from the map database 122, and register position information of the point and a movement cost between two points including the delivery destination of the new customer in the path database 121. The same applies to a case where a pickup destination is a new customer.

The map database 122 stores map data including geographical information of a target region where a package is delivered or picked up. The geographical information includes position information (a position, a distance, a height, and the like of each point) of a section, a building, an address, a road, and the like of the target region. The vehicle allocation planning unit 113 can specify a delivery position or a pickup position based on the map data of the map database 122, and can determine a pickup and delivery route, a reversing point, and the like by using the path data of the path database 121.

The package management unit 111 manages information on a package (package information). The package information may include a package ID for identifying the package, a content (type) of the package, the number of packages, a weight of the package, a size of the package, and the like. The package management unit 111 may manage delivery positions and pickup positions of the packages.

The vehicle management unit 112 manages vehicle information on the vehicle 50. The vehicle information may include a vehicle ID for identifying the vehicle 50, a type of the vehicle, a color of the vehicle, and the like. Further, the vehicle management unit 112 may manage current positions of the vehicles 50, package IDs of packages loaded on the vehicles 50, and the like.

The vehicle allocation planning unit 113 generates a vehicle allocation plan related to vehicle allocation of the vehicles 50 related to delivery or pickup. The vehicle allocation plan may include at least one of a delivery plan related to delivery of the packages by the vehicles 50, a pickup plan related to pickup of the packages by the vehicles 50, and a pickup and delivery plan related to delivery and pickup of the packages by the vehicles 50. The pickup may include pickup of a package for which a pickup request is made during delivery of the packages. The vehicle allocation plan may include a package ID of a package delivered or picked up, a delivery position or a pickup position, a vehicle ID of a vehicle that performs pickup and delivery, a pickup and delivery route, a reversing point of the vehicle, a scheduled delivery time or a scheduled pickup time at each point, a scheduled pickup and delivery completion time, an amount of energy (energy consumption amount), and the like.

The vehicle allocation planning unit 113 may refer to the path database 121 and the map database 122 of the storage unit 12, determine an order of via-points and delivery destinations of the vehicle 50 in accordance with a delivery position or a pickup position, and set a pickup and delivery route. The vehicle allocation planning unit 113 may refer to the path database 121 of the storage unit 12 and calculate a path cost in a case where the vehicle moves through the determined via-points in order. The path cost is a cost in a case of making one round of the pickup and delivery route, and may be a value obtained by adding a movement cost between two points. Further, the vehicle allocation planning unit 113 may determine whether the vehicle needs to be reversed and a reversing point of the vehicle in accordance with an advancing direction of the vehicle 50 and a loading position of a loaded package. The order of the via-points and the delivery destinations of the vehicle 50 may be input via, for example, an operation unit (not shown), or may be determined in accordance with a predetermined algorithm based on a delivery time, a delivery position, or the like.

The vehicle control unit 151 performs various vehicle controls such as detection control of various sensors, control of illumination and display, and the like in addition to traveling control of a power source, steering, braking, and the like of the vehicle 50 based on a pickup and delivery route, a vehicle position, and the like. In the traveling control of the vehicle 50, the vehicle control unit 151 performs control related to reversion during traveling.

The vehicle position estimation unit 152 estimates a position of the vehicle 50. The vehicle position estimation unit 152 may calculate the position (a latitude, a longitude, and an altitude) of the vehicle 50 based on a radio signal received by a satellite positioning system receiver 53 of the vehicle 50. The vehicle position estimation unit 152 may acquire the position of the vehicle 50 on the pickup and delivery route with reference to the map database 122. The vehicle position estimation unit 152 may calculate the position of the vehicle 50 by using various detection signals detected by the vehicle 50. As a detection signal used for position estimation of the vehicle 50, in addition to the radio signal from a satellite acquired by the satellite positioning system receiver 53, a beacon signal from each small transmitter (beacon) disposed on a road, a received electric field strength of a communication signal from a wireless local area network (LAN) base station or a base station for mobile communication disposed at each place, and the like can be used.

The locker management unit 153 acquires a storage state of each package in a package locker 54 of the vehicle 50. The locker management unit 153 manages locking or unlocking of a door of the package locker 54. Further, the locker management unit 153 manages a package ID and package information (the number, a weight, a size, a content, and the like) of a package housed in the package locker 54.

The communication unit 13 can communicate with other devices, for example, a communication unit 32 of the communication terminal 30 and a communication unit 56 of the vehicle 50. As a communication method by the communication unit 13, either wireless communication or wired communication may be used between nodes, depending on a system configuration. The communication method may include various communication methods such as a wide area network (WAN), a LAN, power line communication, infrared communication, short-range wireless communication (for example, Bluetooth® communication), and mobile communication (for example, LTE®).

The communication terminal 30 is used when receiving a package delivery and when receiving a notification of delivery status information. The delivery status information may include a delivery notification of the package, package information (for example, a package ID, the number of packages, a weight of the package, a size of the package, and a content of the package), a position of a delivery destination, a scheduled delivery time, delivery vehicle information (a vehicle ID and a vehicle type), a current delivery status, and the like. Further, the communication terminal 30 is used, for example, in a case where pickup request information is transmitted to the pickup and delivery management server 10 when a user desires pickup. The pickup request information is information on a pickup request, and may include, for example, a desired pickup time, a pickup position, package information (for example, the number of packages, a weight of the package, a size of the package, and a content of the package), and the like. The communication terminal 30 includes a processing unit 31, the communication unit 32, a memory 33, a display unit 34, and an operation unit 35. The communication terminal 30 may be a smartphone, a tablet terminal, a notebook PC, or the like.

The processing unit 31 includes a processor, and realizes various functions, for example, by the processor executing a predetermined program stored in the memory 33. The processor may include an MPU, a CPU, a DSP, a GPU, and the like.

The communication unit 32 can communicate with another device, for example, the communication unit 13 of the pickup and delivery management server 10. As a communication method by the communication unit 32, either wireless communication or wired communication may be used between nodes, depending on a system configuration. The communication method may include various communication methods such as WAN, LAN, power line communication, infrared communication, short-range wireless communication (for example, Bluetooth® communication), and mobile communication (for example, LTE®).

The memory 33 stores the program executed by the processor of the processing unit 31, various constants, temporarily stored data, and the like. The memory 33 includes a primary storage device (for example, a RAM or a ROM). The memory 33 may include a secondary storage device (for example, an HDD or an SSD) or a tertiary storage device (for example, an optical disk or an SD card).

The display unit 34 displays a display screen of the delivery status information and various operation screens. The display unit 34 may include a liquid crystal display device, an organic EL device, or another display device. Further, the display unit 34 displays various data and information in addition to the operation screen.

The operation unit 35 receives various instruction operations and inputs of various pieces of data and information. The operation unit may include a mouse, a keyboard, a touchpad, a microphone, or another input device. The display unit 34 and the operation unit 35 may be configured with a touch panel. The touch panel receives a touch operation by the user and displays an operation screen corresponding to the touch operation.

The vehicle 50 may be an unmanned autonomous driving vehicle for picking up and delivering a package. The vehicle 50 includes a processing unit 51, a storage unit 52, the satellite positioning system receiver 53, the package locker 54, an authentication device 55, and the communication unit 56.

The satellite positioning system receiver 53 receives radio signals transmitted from a positioning system satellite such as a global positioning system (GPS) satellite or a quasi-zenith orbit satellite (Michibiki).

The package locker 54 is a housing that is disposed such that an opening portion faces a side portion of the vehicle 50 and has a space that can house a package. A lockable or unlockable door is provided in the opening portion of the housing so that the user can come near the vehicle 50 and operate the package locker 54 to take out and deposit a package. The package locker 54 may include an opening portion at a back portion of the vehicle 50.

The authentication device 55 is disposed in the package locker 54 or in the vicinity thereof, and authenticates the user. The authentication device 55 may be a keypad that receives an input of authentication information such as an ID and a password by a user operation, a fingerprint reader that reads a fingerprint of the user, a face camera that authenticates a face of the user, or the like.

The processing unit 51 includes a processor, and realizes various functions, for example, by the processor executing a predetermined program stored in the storage unit 52. The processor may include an MPU, a CPU, a DSP, a GPU, and the like. The processing unit 51 includes a vehicle control unit 511 and a locker drive unit 514 as functional configurations. The vehicle control unit 511 and the locker drive unit 514 are functions obtained by the processor executing a predetermined program.

The vehicle control unit 511 performs traveling control of a power source (a motor or an engine), steering, braking, and the like of the vehicle 50, and performs various vehicle controls such as detection control of various sensors and control of illumination and display, based on an instruction of the vehicle control unit 151 of the pickup and delivery management server 10.

The locker drive unit 514 manages locking or unlocking of the door of the package locker 54 based on an instruction of the locker management unit 153 of the pickup and delivery management server 10. Further, the locker drive unit 514 acquires a package ID and package information (the number, a weight, a size, a content, and the like) of a package housed in the package locker 54.

The storage unit 52 stores the program executed by the processor of the processing unit 51, various constants, temporarily stored data, and the like. The storage unit 52 stores map data 522 including the pickup and delivery route and the like sent from the pickup and delivery management server 10. The storage unit 52 includes a primary storage device (for example, a RAM or a ROM). The storage unit 52 may include a secondary storage device (for example, an HDD or an SSD) or a tertiary storage device (for example, an optical disk or an SD card).

The communication unit 56 can communicate with another device, for example, the communication unit 13 of the pickup and delivery management server 10. A communication method by the communication unit 56 may include various communication methods such as WAN, LAN, power line communication, infrared communication, short-range wireless communication (for example, Bluetooth® communication), and mobile communication (for example, LTE®), depending on a system configuration.

Figure 2B:
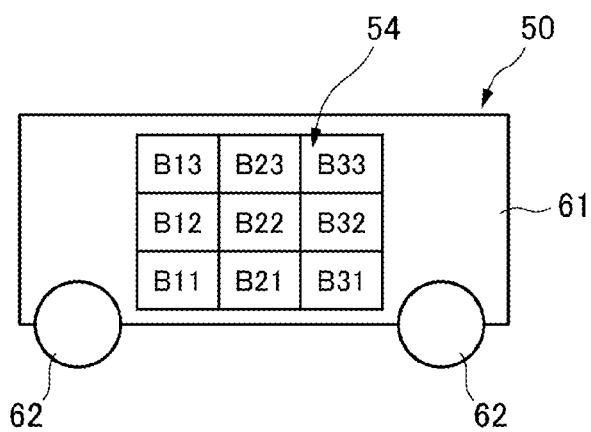
Figure 2C:
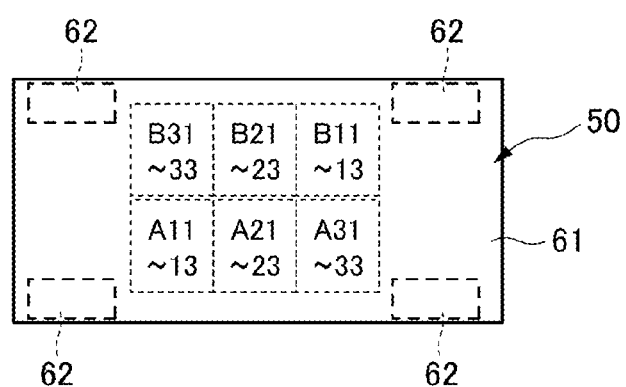

FIGS. 2A to 2C are schematic views showing a configuration example of the vehicle and the package locker portion according to the embodiment. FIG. 2A is a perspective view seen from one side surface, FIG. 2B is a side view showing the other side surface, and FIG. 2C is a plan view seen through from above.

The vehicle 50 of the present embodiment includes a vehicle body 61 having a substantially symmetrical shape in a front-rear direction in an advancing direction and four wheels 62, and is configured to be able to advance bi-directionally by reversing (switching back) in the front-rear direction. The shape of the vehicle, the number of wheels, and the like are not limited thereto, and various modes can be applied. The package locker 54 including a plurality of package compartments for storing packages is provided on a side surface portion of the vehicle body 61. For example, as shown in FIG. 2A, the package compartments A11, A12, A13, A21, A22, A23, A31, A32, and A33 on one side of the package locker 54 are arranged in one side surface portion (for example, a first side surface or a first side) of the vehicle body 61. Further, as shown in FIG. 2B, the package compartments B11, B12, B13, B21, B22, B23, B31, B32, and B33 on the other side of the package locker 54 are arranged in the other side surface portion (for example, a second side surface or a second side) of the vehicle body 61. That is, as shown in FIG. 2C, on both left and right sides of the vehicle body 61, the package compartments A11 to A33 of the package locker 54 are arranged on the first side and the package compartments B11 to B33 of the package locker 54 are arranged on the second side, and the opening portions are provided in a state of facing the side portions in opposite directions.

Each of the package compartments A11 to A33 and B11 to B33 of the package locker 54 includes the door provided with an electronic lock in each package compartment, and user authentication and unlocking of the door can be performed by, for example, an operation of the communication terminal 30 such as a smartphone used by the user. When the vehicle 50 arrives at a designated delivery destination or pickup destination, the user operates the communication terminal 30 to unlock a package compartment of a package to be delivered or picked up, takes out the package, or deposits the package. After the vehicle 50 arrives at the delivery destination or the pickup destination, the vehicle 50 checks user authentication, unlocking the door of the package compartment, taking out or depositing the package, the door being closed, and locks the door of the package compartment to perform a completion processing of delivery or pickup, by the communication terminal 30.

Hereinafter, some examples of a traveling operation of the vehicle 50 in the present embodiment will be described. When performing delivery or pickup of a package, the vehicle 50 of the present embodiment controls a traveling operation and a reversing operation based on a direction in which a delivery destination or a pickup destination faces a road with respect to an advancing direction of the vehicle (a side of a target user point with respect to the advancing direction of the vehicle) and a direction of a side surface portion where a package compartment that stores a target package is positioned (a side of a side surface where a target package compartment is located). Control of the traveling operation of the vehicle 50 is mainly executed by the processing unit 11 of the pickup and delivery management server 10. The pickup and delivery management server 10 can provide an instruction of a reversing operation of the vehicle 50 by determining a reversing point when setting a pickup and delivery route. Further, when the vehicle 50 is directed to a next delivery destination or pickup destination, the pickup and delivery management server 10 can also instruct the vehicle 50 to perform the reversing operation in a case where a direction of the delivery destination or pickup destination and a direction of the target package compartment are on opposite sides, depending on the direction of the delivery destination or pickup destination and the direction of the target package compartment.

For example, in a case where a side of the delivery destination or the pickup destination with respect to the advancing direction of the vehicle, that is, the direction in which the delivery destination or the pickup destination faces the road with respect to the advancing direction is on the same side as the side of the side surface where the package compartment that stores the target package is positioned, the vehicle travels in the advancing direction as it is and reaches a point of the delivery destination or the pickup destination, and a side surface of the vehicle is brought close to a roadside facing the point to stop the vehicle. In a case of a left-hand traffic road, when the delivery destination or the pickup destination is on a left side with respect to the advancing direction and a package compartment of a package to be delivered or picked up is on the left side with respect to the advancing direction, the vehicle travels as it is and arrives at the delivery destination or the pickup destination, and a left side surface of the vehicle is brought close to a roadside to stop the vehicle. In a case of a right-hand traffic road, when the delivery destination or the pickup destination is on a right side with respect to the advancing direction and the package compartment of the package to be delivered or picked up is on the right side with respect to the advancing direction, the vehicle travels as it is and arrives at the delivery destination or the pickup destination, and a right side surface of the vehicle is brought close to a roadside to stop the vehicle.

On the other hand, for example, in a case where the side of the delivery destination or the pickup destination with respect to the advancing direction of the vehicle, that is, the direction in which the delivery destination or the pickup destination faces the road with respect to the advancing direction is on a side opposite to the side of the side surface where the package compartment that stores the target package is positioned, the vehicle travels in an opposite direction by reversing the advancing direction on the way and reaches a point of the delivery destination or the pickup destination, and the side surface of the vehicle is brought close to a roadside facing the point to stop the vehicle. In a case of a left-hand traffic road, when the delivery destination or the pickup destination is on a left side with respect to the advancing direction and the package compartment of the package to be delivered or picked up is on a right side (an opposite side) with respect to the advancing direction, the vehicle travels after the advancing direction is reversed and the direction of the target package compartment is changed to the left side, the vehicle arrives at the delivery destination or the pickup destination, and a left side surface of the vehicle is brought close to a roadside to stop the vehicle. In a case of a right-hand traffic road, when the delivery destination or the pickup destination is on a right side with respect to the advancing direction and the package compartment of the package to be delivered or picked up is on a left side (an opposite side) with respect to the advancing direction, the vehicle travels after the advancing direction is reversed and the direction of the target package compartment is changed to the right side, the vehicle arrives at the delivery destination or the pickup destination, and a right side surface of the vehicle is brought close to a roadside to stop the vehicle.

Figure 3:
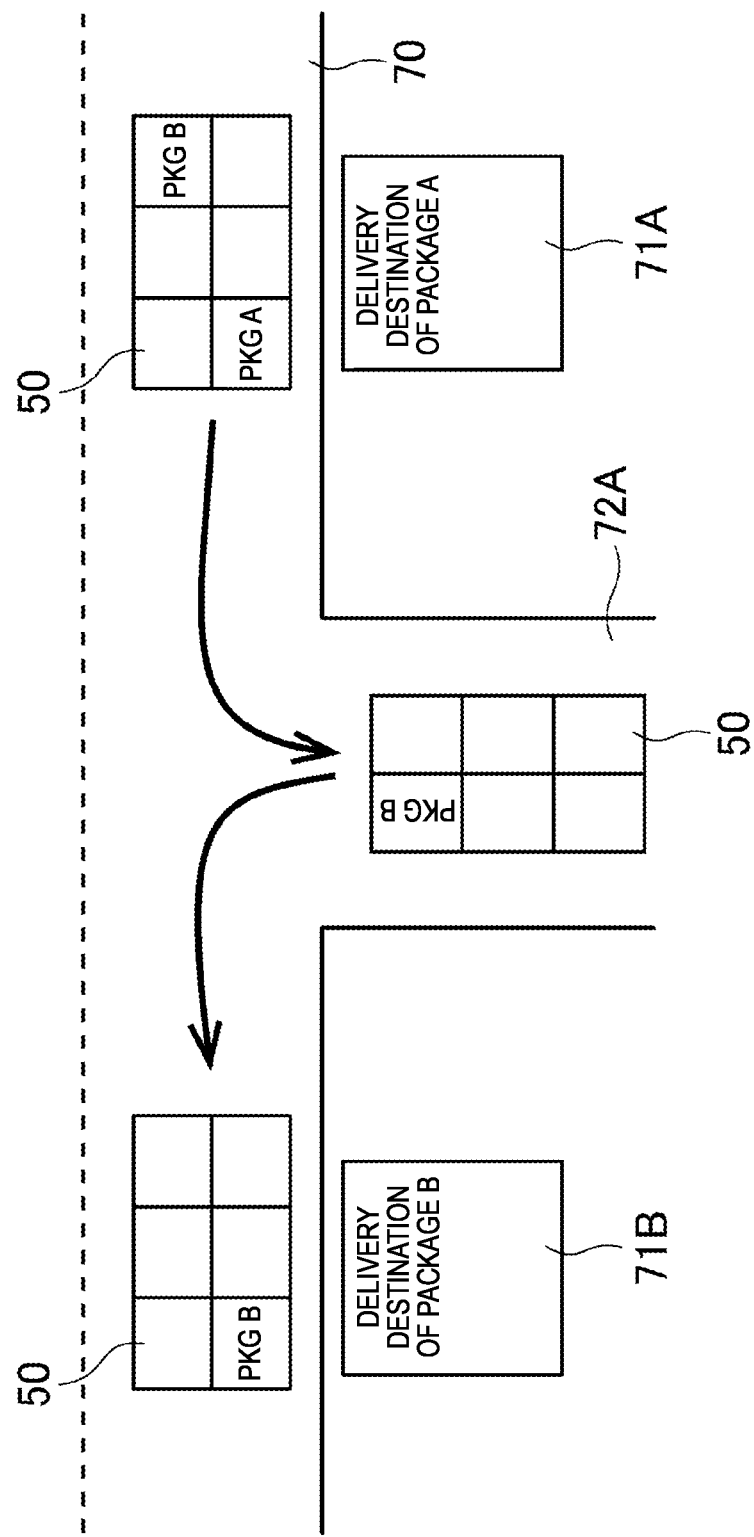
FIG. 3 is a diagram showing a first example of a traveling operation of the vehicle according to the embodiment.

FIG. 3 is a diagram showing a first example of a traveling operation of the vehicle 50 according to the embodiment. In the present embodiment, a road of a traffic system of left-hand traffic will be described as an example. On a road of a traffic system of right-hand traffic, the same traveling control may be performed in a state where left and right sides are reversed.

The first example illustrates a case where a package in a package compartment on a right side of the vehicle 50 is delivered to a delivery destination on a left side of a road. In the first example, on a road 70, a delivery destination 71A of a package A and a delivery destination 71B of a package B are positioned facing a left side with respect to an advancing direction. In this case, the vehicle 50 delivers the package A to the delivery destination 71A of the package A, performs the user authentication or the like for the package A (PKG A) in a package compartment on a left side, and completes reception. Then, the vehicle 50 is reversed at a reversing point 72A positioned on a path to the delivery destination 71B of the package B. By the reversing operation, a position of the package compartment of the package B (PKG B) is reversed in a left side direction opposite to the advancing direction. Then, the vehicle 50 delivers the package B to the delivery destination 71B of the package B, performs the user authentication or the like for the package B (PKG B) in a package compartment on a left side, and completes reception.

Figure 4:
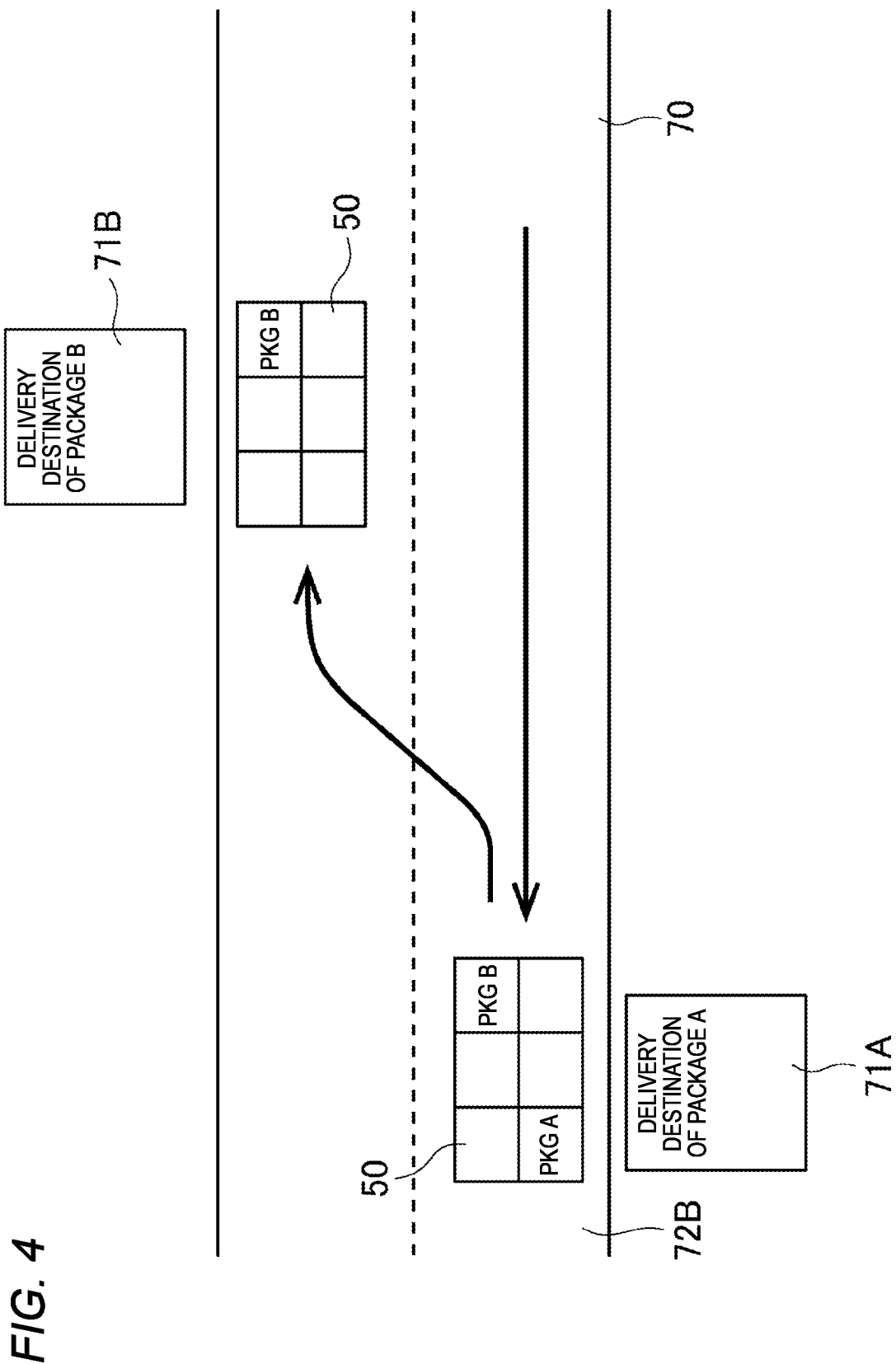
FIG. 4 is a diagram showing a second example of the traveling operation of the vehicle according to the embodiment.

FIG. 4 is a diagram showing a second example of the traveling operation of the vehicle 50 according to the embodiment. The second example illustrates a case where a package in a package compartment on a right side of the vehicle 50 is delivered to a delivery destination on a right side of a road. In the second example, on the road 70, the delivery destination 71A of the package A is positioned to face a left side with respect to an advancing direction, and the delivery destination 71B of the package B is positioned to face a right side with respect to the advancing direction. In this case, the vehicle 50 delivers the package A to the delivery destination 71A of the package A, performs the user authentication or the like for the package A (PKG A) in a package compartment on a left side, and completes reception. Then, the vehicle 50 is reversed on the road 70 at a reversing point 72B, and the vehicle 50 advances in an opposite direction with left-hand traffic. By the reversing operation, the package compartment of the package B (PKG B) is positioned in a left side direction with respect to the advancing direction. Then, the vehicle 50 delivers the package B to the delivery destination 71B of the package B, performs the user authentication or the like for the package B (PKG B) in a package compartment on a left side, and completes reception.

Figure 5:
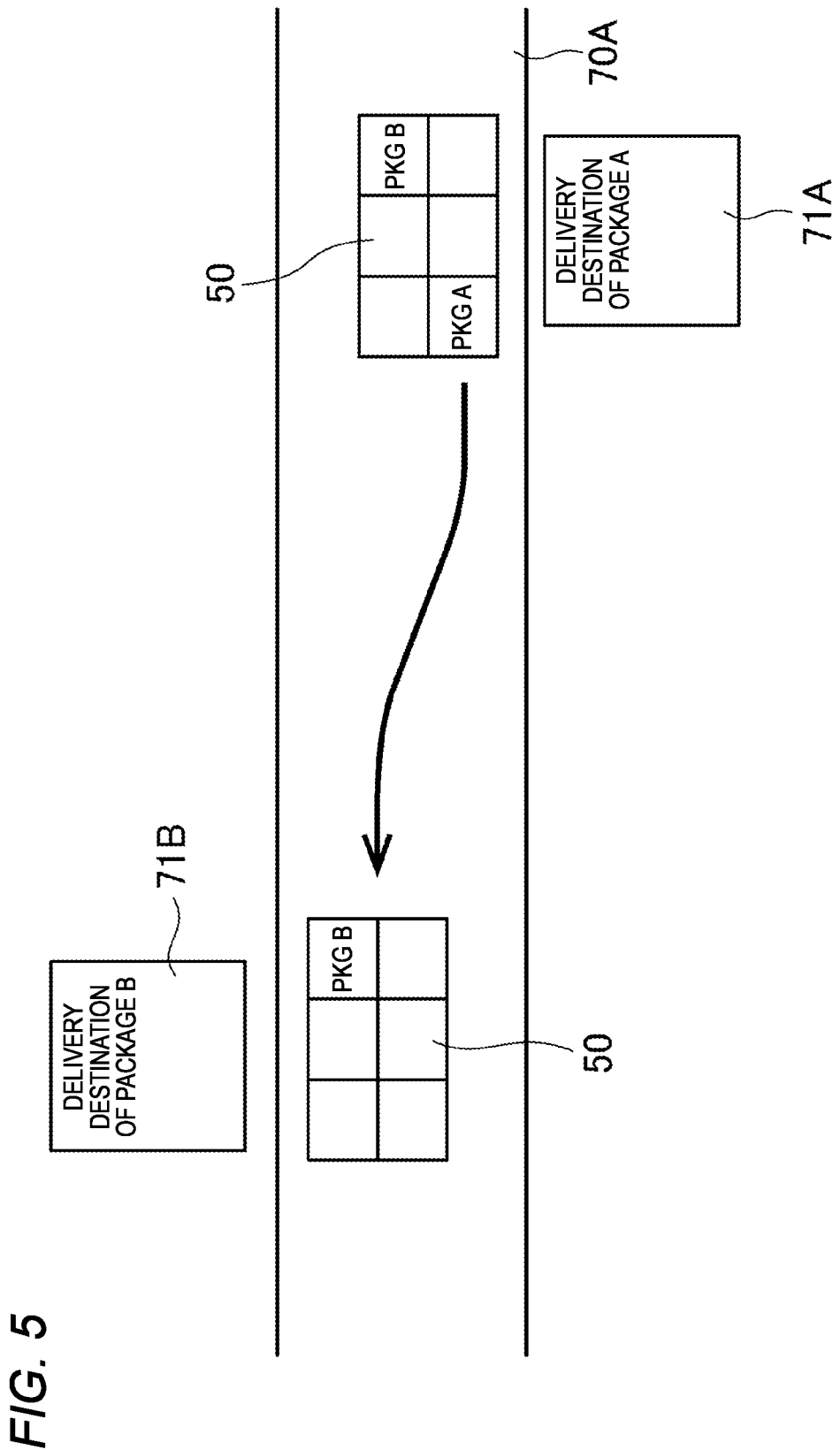
FIG. 5 is a diagram showing a third example of the traveling operation of the vehicle according to the embodiment.

FIG. 5 is a diagram showing a third example of the traveling operation of the vehicle 50 according to the embodiment. The third example illustrates a case where packages are respectively delivered to a delivery destination on a left side of a road and to a delivery destination after turning left on a one-way road 70A. In the third example, on the one-way road 70A, the delivery destination 71A of the package A is positioned to face a left side with respect to an advancing direction, and the delivery destination 71B of the package B is positioned to face a right side with respect to the advancing direction. Here, it is assumed that the package A is stored in a package compartment on a left side of the vehicle 50, and the package B is stored in a package compartment on a right side. In this case, the vehicle 50 stops by bringing the package compartment on the left side close to a left side of the road 70A with respect to the delivery destination 71A of the package A, performs the user authentication or the like for the package A (PKG A) in the package compartment on the left side, and completes reception. Thereafter, the vehicle 50 advances on the one-way road 70A as it is, stops by bringing the package compartment on the right side close to a right side of the road 70A with respect to the delivery destination 71B of the package B, performs the user authentication or the like for the package B (PKG B) in the package compartment on the right side, and completes reception.

In a case where a package to be delivered is stored in a package compartment on a side opposite to a delivery destination in an advancing direction, the vehicle 50 may be reversed similarly to the first example, a direction in which the delivery destination faces a road and a side of the package compartment that stores the target package may be positioned on the same side, and then the vehicle may be directed to the delivery destination.

Next, some examples of a specific delivery procedure for a plurality of delivery destinations will be described. In the following specific example, the number of package compartments of the package locker 54 provided in the vehicle 50, the number of packages, the number of delivery destinations, a position of a delivery point, and the like are shown in a simplified manner, but the present disclosure is not limited thereto, and various modes can be considered.

Figure 6:
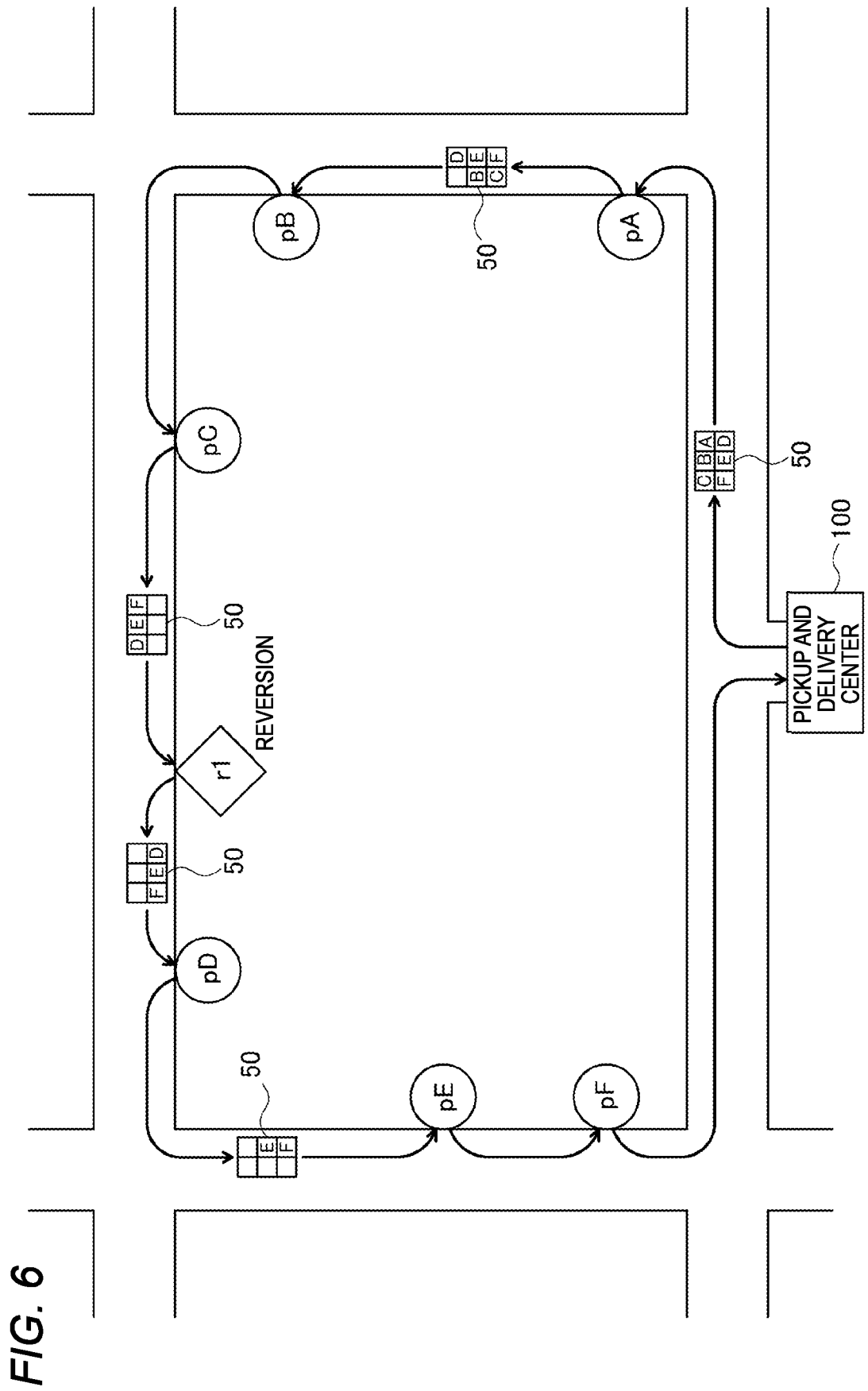
FIG. 6 is a diagram showing a first example of a specific example of a delivery procedure to a plurality of delivery destinations according to the embodiment.

FIG. 6 is a diagram showing a first example of a specific example of a delivery procedure to the plurality of delivery destinations according to the embodiment. The first example of the delivery procedure shows a delivery operation in a case where a pickup and delivery route including a reversing operation in traveling in the same direction is set, which corresponds to the first example of the traveling operation shown in FIG. 3. The pickup and delivery management server 10 sets a pickup and delivery route for respectively delivering a package A, a package B, a package C, a package D, a package E, and a package F to six delivery destinations pA, pB, pC, pD, pE, and pF. In the example of FIG. 6, on a traveling path of the vehicle 50, the delivery destinations pA to pF face a left side of the road with respect to the advancing direction. In this case, in an initial advancing direction, a pickup and delivery route is determined such that the package A to the package C in package compartments on a left side of the vehicle 50 are advanced and delivered in the same direction, and the package D to the package F in package compartments on a right side of the vehicle 50 are delivered after the advancing direction is reversed. That is, the pickup and delivery route is set in which, after passing through all the delivery destinations where a side of a delivery destination with respect to the advancing direction of the vehicle and a side of a side surface where a package compartment that stores a target package is positioned coincide with each other, the advancing direction of the vehicle is reversed once at a reversing point, and the rest of delivery destinations are passed through.

In a delivery preparation stage, at a pickup and delivery center 100, a worker or a work robot loads the packages to be delivered on the package locker 54 of the vehicle 50 in accordance with a delivery plan along the pickup and delivery route. When the loading of the packages is completed, the pickup and delivery management server 10 acquires a storage state of the packages stored in the package compartments to generate position information of the package compartments. Then, the pickup and delivery management server 10 instructs the vehicle 50 to travel to the delivery destinations. The vehicle 50 starts delivery of the packages in a predetermined order of the delivery destinations in accordance with the delivery plan based on the instruction of the pickup and delivery management server 10.

The vehicle 50 departs from the pickup and delivery center 100, first travels toward and arrives at the delivery destination pA of the package A, delivers the package A in the package compartment on the left side to a user of the delivery destination pA, performs user authentication or the like, and completes reception. Then, the vehicle 50 travels toward and arrives at the delivery destination pB of the package B as it is, delivers the package B in the package compartment on the left side to a user of the delivery destination pB, and completes reception. Similarly, the vehicle 50 travels toward and arrives at the delivery destination pC of the package C after turning left, delivers the package C in the package compartment on the left side to a user of the delivery destination pC, and completes reception.

Next, the vehicle 50 travels toward a reversing point r1, and reverses the advancing direction at the reversing point r1. By the reversing operation, sides of the package compartments of the package locker 54 of the vehicle 50 are reversed in a left-right direction, and the package D to the package F are positioned in the package compartments on the left side with respect to the advancing direction. Then, the vehicle 50 travels toward and arrives at the delivery destination pD of the package D in the advancing direction after the inversion, delivers the package D in the package compartment on the left side to a user of the delivery destination pD, and completes reception. Then, the vehicle 50 travels toward and arrives at the delivery destination pE of the package E after turning left, delivers the package E in the package compartment on the left side to a user of the delivery destination pE, and completes reception. Then, the vehicle 50 travels toward and arrives at the delivery destination pF of the package F as it is, delivers the package F in the package compartment on the left side to a user of the delivery destination pF, completes reception, and then returns to the pickup and delivery center 100 after turning left.

Figure 7:
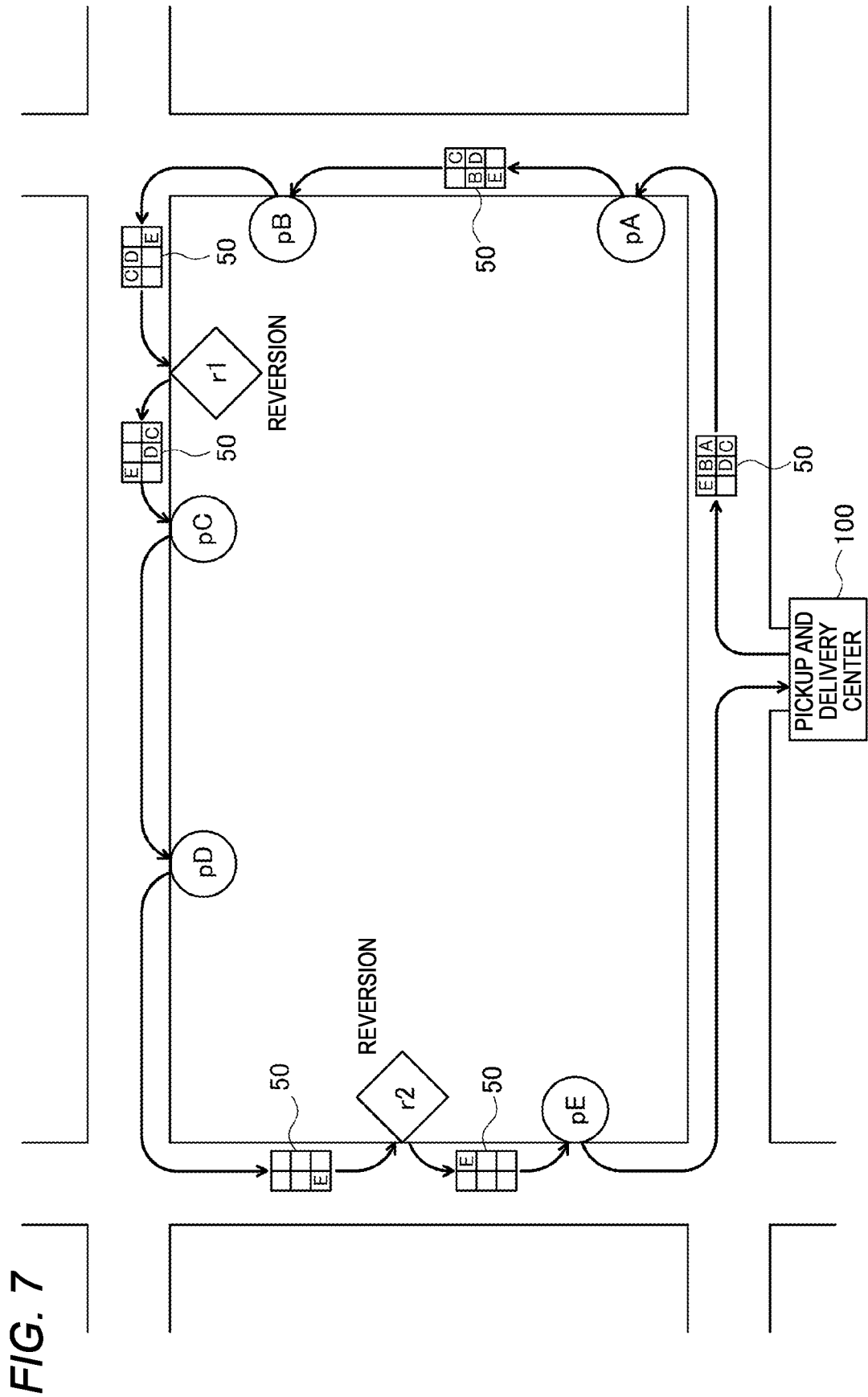
FIG. 7 is a diagram showing a second example of a specific example of a delivery procedure to a plurality of delivery destinations according to the embodiment.

FIG. 7 is a diagram showing a second example of the specific example of the delivery procedure to a plurality of delivery destinations according to the embodiment. The second example of the delivery procedure is another example showing a variation of the first example shown in FIG. 6. The pickup and delivery management server 10 sets a pickup and delivery route for respectively delivering the packages A to E to the five delivery destinations pA to pE. In the example of FIG. 7, in an initial advancing direction, the package A, the package B, and the package E are stored in package compartments on a left side of the vehicle 50, and the package C and the package D are stored in package compartments on a right side of the vehicle 50. In this case, a pickup and delivery route is determined such that the package A and the package B are advanced and delivered in the same direction, the package C and the package D are delivered after the advancing direction is reversed, and the package E is delivered after the advancing direction is further reversed. That is, a shortest path (a path with a minimum path cost) passing through the delivery destinations is adopted, and the pickup and delivery route is set in which in a case where a side of a delivery destination with respect to the advancing direction of the vehicle and a side of a side surface where a package compartment that stores a target package is positioned do not coincide with each other, the advancing direction of the vehicle is reversed before a corresponding delivery destination.

The vehicle 50 departs from the pickup and delivery center 100, first travels toward and arrives at the delivery destination pA of the package A, delivers the package A in the package compartment on the left side to a user of the delivery destination pA, performs user authentication or the like, and completes reception. Then, the vehicle 50 travels toward and arrives at the delivery destination pB of the package B as it is, delivers the package B in the package compartment on the left side to the user of the delivery destination pB, and completes reception. Thereafter, the vehicle 50 travels toward the reversing point r1 after turning left, and reverses the advancing direction at the reversing point r1. By the reversing operation, sides of the package compartments of the package locker 54 of the vehicle 50 are reversed in a left-right direction, and the package C and the package D are positioned in the package compartments on the left side with respect to the advancing direction. Then, the vehicle 50 travels toward and arrives at the delivery destination pC of the package C in the advancing direction after the inversion, delivers the package C in the package compartment on the left side to the user of the delivery destination pC, and completes reception. Similarly, the vehicle 50 travels toward and arrives at the delivery destination pD of the package D, delivers the package D in the package compartment on the left side to the user of the delivery destination pD, and completes reception.

Next, the vehicle 50 travels toward a reversing point r2 after turning left, and reverses the advancing direction at the reversing point r2. By the reversing operation, the package E is positioned in the package compartment on the left side with respect to the advancing direction. Then, the vehicle 50 travels toward and arrives at the delivery destination pE of the package E in the advancing direction after the inversion, delivers the package E in the package compartment on the left side to the user of the delivery destination pE, and completes reception. Thereafter, the vehicle 50 returns to the pickup and delivery center 100 after turning left.

Figure 8:
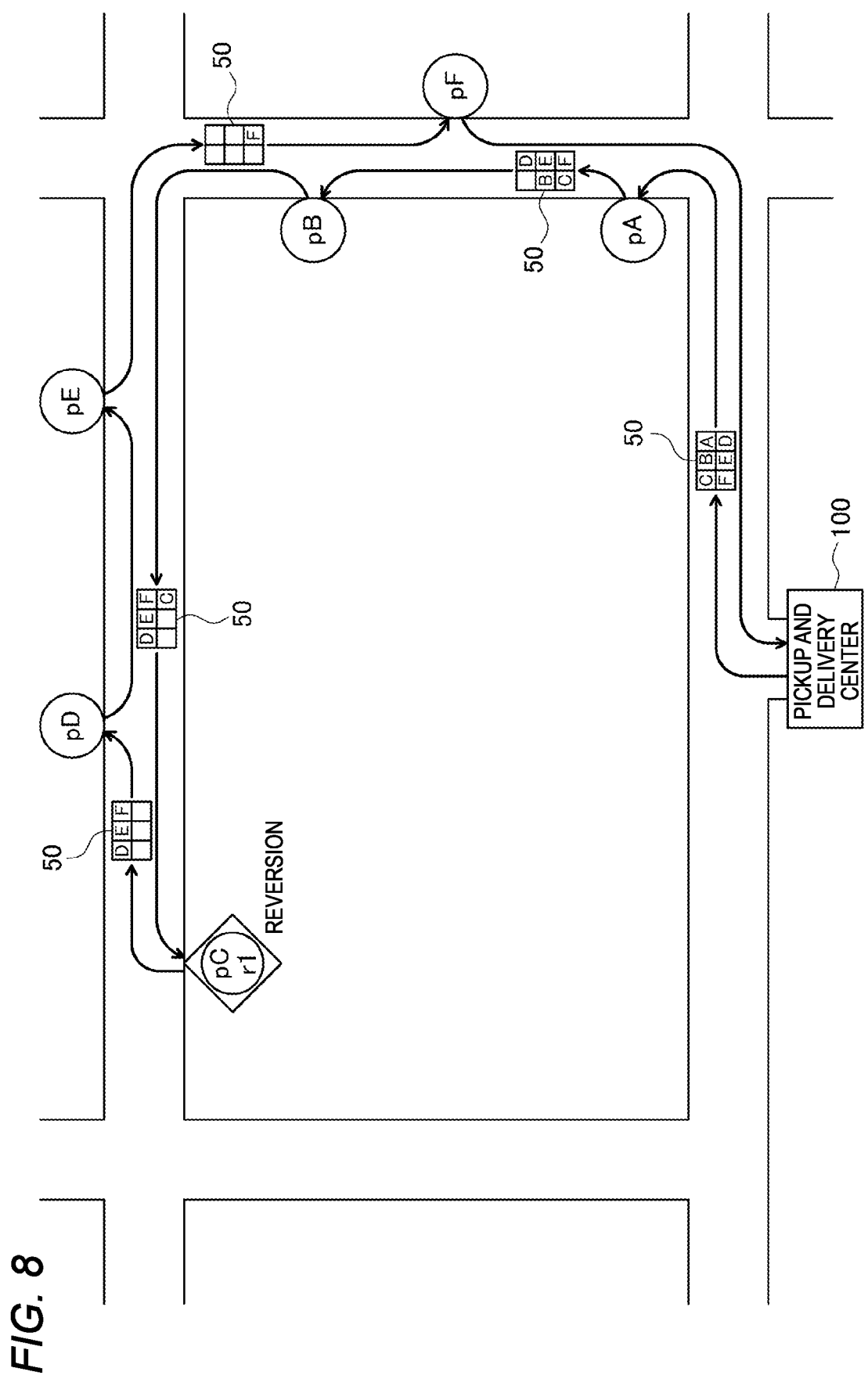
FIG. 8 is a diagram showing a third example of a specific example of a delivery procedure to a plurality of delivery destinations according to the embodiment.

FIG. 8 is a diagram showing a third example of the specific example of the delivery procedure to a plurality of delivery destinations according to the embodiment. The third example of the delivery procedure shows a delivery operation in a case where a pickup and delivery route including a reversing operation in traveling in an opposite direction from a current traveling direction is set, which corresponds to the second example of the traveling operation shown in FIG. 4. The pickup and delivery management server 10 sets a pickup and delivery route for respectively delivering the packages A to F to the six delivery destinations pA to pF. In the example of FIG. 8, on the traveling path of the vehicle 50, the delivery destinations pA to pC face a left side of a road with respect to an advancing direction, and the delivery destinations pD to pF face a right side of the road with respect to the advancing direction. In this case, in the initial advancing direction, a pickup and delivery route is determined such that the package A to the package C in package compartments on a left side of the vehicle 50 are advanced and delivered in the same direction, and the package D to the package F in package compartments on a right side of the vehicle 50 are delivered by reversing the advancing direction and being advanced in an opposite direction.

The vehicle 50 departs from the pickup and delivery center 100, first travels toward and arrives at the delivery destination pA of the package A, delivers the package A in the package compartment on the left side to a user of the delivery destination pA, performs user authentication or the like, and completes reception. Then, the vehicle 50 travels toward and arrives at the delivery destination pB of the package B as it is, delivers the package B in the package compartment on the left side to the user of the delivery destination pB, and completes reception. Subsequently, the vehicle 50 travels toward and arrives at the delivery destination pC of the package C after turning left, delivers the package C in the package compartment on the left side to the user of the delivery destination pC, and completes reception.

Next, the vehicle 50 switches back at the reversing point r1 of a point of the delivery destination pC or a point in the vicinity thereof, reverses the advancing direction, and advances in an opposite direction on the left side of the road. By the reversing operation, sides of the package compartments of the package locker 54 of the vehicle 50 are reversed in a left-right direction, and the package D to the package F are positioned in the package compartments on the left side with respect to the advancing direction. Then, the vehicle 50 travels toward and arrives at the delivery destination pD of the package D on the left side of the road in an advancing direction after the inversion, delivers the package D in the package compartment on the left side to the user of the delivery destination pD, and completes reception. Subsequently, the vehicle 50 travels toward and arrives at the delivery destination pE of the package E as it is, delivers the package E in the package compartment on the left side to the user of the delivery destination pE, and completes reception. Then, the vehicle 50 travels toward and arrives at the delivery destination pF of the package F after turning right, delivers the package F in the package compartment on the left side to the user of the delivery destination pF, completes reception, and then returns to the pickup and delivery center 100 after turning right.

In the above operation example, the operation when the package is delivered has been described, but the same can be applied to a case where the package is picked up and a case where the package is both delivered and picked up. In a case of pickup, the vehicle is reversed as necessary in accordance with a position of a pickup destination such that a side of an empty package compartment for storing a package to be picked up is aligned with a side on which the pickup destination where the user is positioned faces a road. For example, in a case where, in a current advancing direction, the pickup destination faces a left side of the road with respect to the advancing direction and the empty package compartment is on a right side of the vehicle 50, the vehicle 50 is reversed, advances by reversing the advancing direction, and travels to the pickup destination to perform the pickup.

As described above, in the present embodiment, the vehicle 50 performs a reversing operation, in a case where a package compartment of a target package is on a side opposite to a delivery destination or a pickup destination, in accordance with a position of the delivery destination or the pickup destination and a direction with respect to the road. Accordingly, it is possible to perform delivery or pickup in such a manner that a side of a package compartment that stores a target package is aligned with a side on which the delivery destination or the pickup destination faces the road.

As an example of a vehicle control operation of the present embodiment, an operation related to inversion of the vehicle when delivering or picking up a package in the present embodiment will be described.

Figure 9:
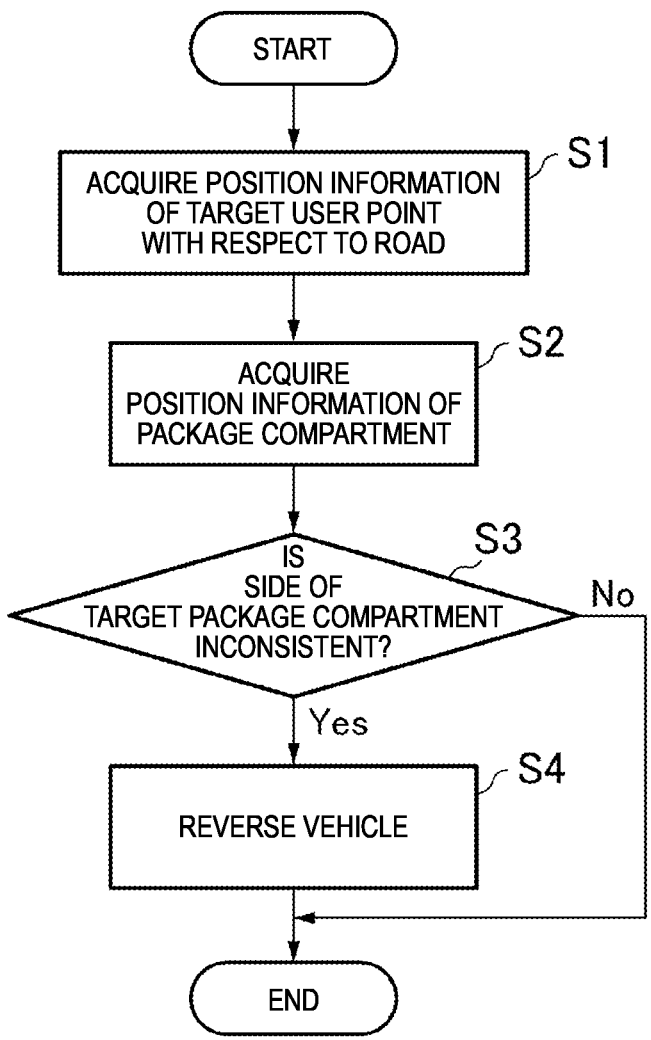
FIG. 9 is a flowchart showing a processing procedure of a reversing operation of the vehicle when delivering or picking up a package according to the embodiment.

FIG. 9 is a flowchart showing a processing procedure of a reversing operation of the vehicle when delivering or picking up a package according to the embodiment. The example of FIG. 9 shows a case where the pickup and delivery management server 10 mainly transmits an instruction to the vehicle 50 to cause the vehicle 50 to travel. A processing related to inversion of the vehicle is mainly executed by the vehicle control unit 151 or the vehicle allocation planning unit 113 in the processing unit 11 of the pickup and delivery management server 10. The present disclosure is similarly applicable to a case where the vehicle 50 mainly travels. In this case, the processing unit 51 of the vehicle 50 may execute the processing related to the inversion of the vehicle.

The processing unit 11 of the pickup and delivery management server 10 acquires position information of a point (a target user point) that is designated by the user and serves as a delivery destination or a pickup destination and road information of a pickup and delivery target area (a pickup and delivery area) including the delivery destination or the pickup destination, and acquires position information of the target user point with respect to a road (S1). That is, a direction (a road direction) in which a point of the delivery destination or the pickup destination designated by the user faces the road is acquired. The target user point includes not only a point at a current position where the user is currently positioned, but also a predetermined point optionally designated by the user as the delivery destination or the pickup destination. Further, the processing unit 11 acquires position information of a package compartment including a side (a left side or a right side) with respect to a vehicle advancing direction for a package compartment that stores a package to be delivered or a package compartment that stores a package to be picked up (S2).

Next, the processing unit 11 determines whether the side of the target package compartment with respect to the advancing direction of the vehicle coincides with the side of the target user point based on the position information of the target user point with respect to the road and the position information of the package compartment (S3). When the side of the target package compartment with respect to the advancing direction of the vehicle does not coincide with the side of the target user point, the processing unit 11 transmits a reversing instruction to reverse the advancing direction to the vehicle 50, and reverses the vehicle 50 at a predetermined reversing point (S4). Accordingly, the vehicle 50 performs the reversing operation to turn the advancing direction in an opposite direction, and causes the side of the target package compartment for performing delivery or pickup to coincide with the side of the target user point with respect to the advancing direction of the vehicle. For example, in a case where the target user point faces a left side of the road and the side of the target package compartment is on a right side with respect to the advancing direction, the advancing direction of the vehicle is reversed, the side of the target package compartment is set to the left side, and the package compartment is caused to arrive toward a side close to the target user point.

As another example of the vehicle control operation of the present embodiment, an operation related to determination of a pickup and delivery route in delivery or pickup of a package according to the present embodiment will be described.

Figure 10:
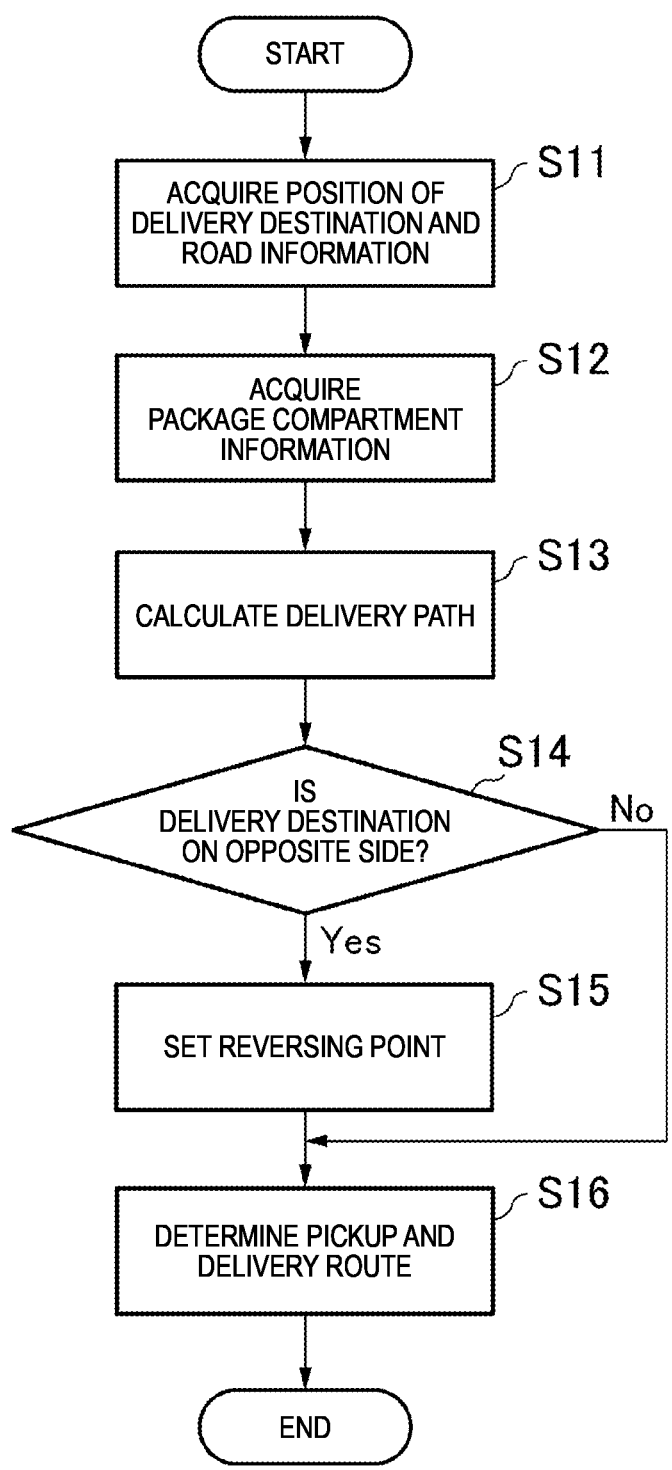
FIG. 10 is a flowchart showing a processing procedure of determining a pickup and delivery route in a pickup and delivery management server.

FIG. 10 is a flowchart showing a processing procedure of determining a pickup and delivery route in the pickup and delivery management server 10. An example of FIG. 10 shows an example in which a pickup and delivery route including a path to delivery destinations for delivering packages to a plurality of delivery destinations is set. A processing of determining the pickup and delivery route is mainly executed by the vehicle allocation planning unit 113 in the processing unit 11 of the pickup and delivery management server 10. The processing unit 11 of the pickup and delivery management server 10 acquires positions of delivery destinations and road information of a pickup and delivery area including the positions of the delivery destinations (S11). Information stored in the path database 121 and the map database 122 of the storage unit 12 is used as the position of the delivery destination and the road information of the pickup and delivery area. Further, the processing unit 11 acquires, as package compartment information of packages stored in the vehicle 50, package IDs of the packages and position information of package compartments that store the packages in the package locker 54 (S12). Then, the processing unit 11 determines an order of the delivery destinations and calculates a delivery path, based on positions of the plurality of delivery destinations and the road information of the pickup and delivery area (S13). The delivery path may be calculated in accordance with a movement cost between points and the like. Next, the processing unit 11 acquires a direction in which a delivery destination faces the road with respect to an advancing direction toward the delivery destinations on the delivery path, and determines whether a package compartment that stores a target package is positioned on an opposite side (S14).

As for a certain delivery destination, in a case where there is a delivery destination where a package compartment that stores a package to be delivered is on the opposite side, the processing unit 11 sets a reversing point on a path toward the corresponding delivery destination (S15). Then, the processing unit 11 calculates a delivery path including a point of the delivery destination and the reversing point, and determines a pickup and delivery route (S16). Before the pickup and delivery route is determined, the order of the delivery destinations may be changed in accordance with the number of reversing points, a position of a reversing point, and a movement cost between points, and the delivery path may be recalculated.

The pickup and delivery management server 10 transmits information of a vehicle allocation plan including the pickup and delivery route to the vehicle 50, causes the vehicle 50 to travel in accordance with the vehicle allocation plan, and causes the packages to be delivered to the delivery destinations. At this time, the pickup and delivery management server 10 causes the vehicle 50 to travel along the pickup and delivery route, causes the vehicle 50 to reverse at a reversing point as necessary, and causes the packages to be delivered to the delivery destinations.

As another example of the vehicle control operation of the present embodiment, the pickup and delivery management server 10 may set a reversing point on the pickup and delivery route at the time of vehicle allocation planning, and may also cause the vehicle 50 to reverse as necessary when traveling toward a next delivery destination or pickup destination. For example, the pickup and delivery management server 10 acquires position information, road information, and package compartment information of the next delivery destination, and causes the vehicle 50 to reverse in a case where a side of a target point of the delivery destination with respect to an advancing direction of the vehicle and a side of a package compartment that stores a target package are on opposite sides.

Figure 11:
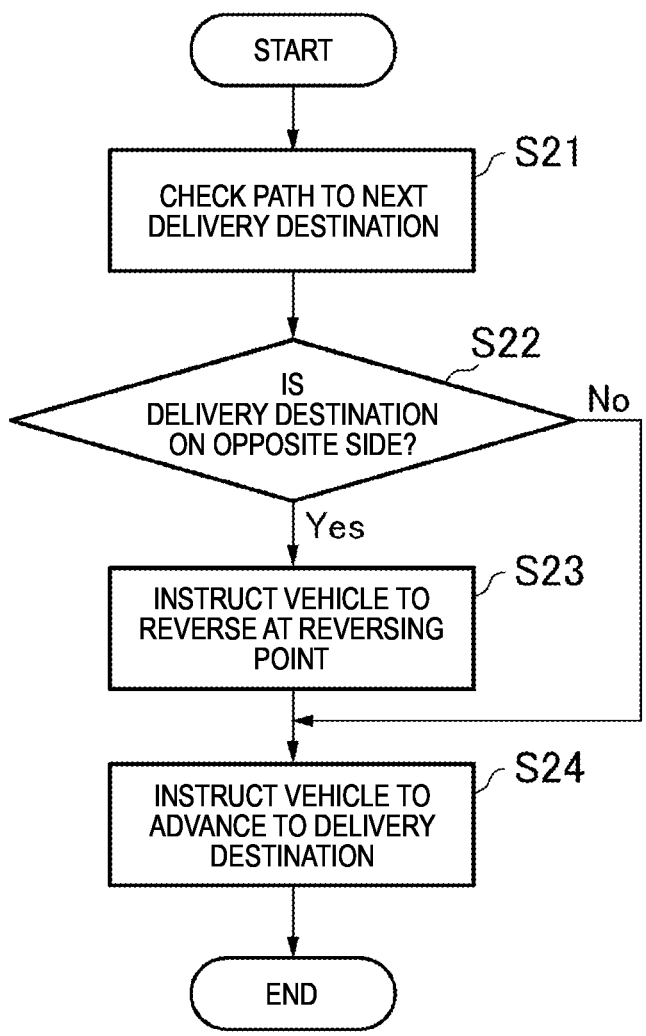
FIG. 11 is a flowchart showing a processing procedure of a travel instruction to the vehicle regarding a next destination point in the pickup and delivery management server.

FIG. 11 is a flowchart showing a processing procedure of a travel instruction to the vehicle 50 regarding a next destination point in the pickup and delivery management server 10. An example of FIG. 11 shows an example in which, when delivering packages to a plurality of delivery destinations, a travel instruction regarding a next delivery destination is issued during traveling of the vehicle. The processing of the travel instruction to the vehicle is mainly executed by the vehicle control unit 151 in the processing unit 11 of the pickup and delivery management server 10. The processing unit 11 of the pickup and delivery management server 10 acquires a position of a next delivery destination, a path to the delivery destination, and package compartment information of the vehicle, and checks the path to the next delivery destination (S21). Then, the processing unit 11 determines whether a side where the delivery destination faces the road and a side of a package compartment that stores a package to be delivered are positioned on opposite sides with respect to an advancing direction toward the next delivery destination (S22).

In a case where the package compartment that stores the package to be delivered is on an opposite side of a road direction of the next delivery destination with respect to the advancing direction of the vehicle, the processing unit 11 transmits a reversing instruction to the vehicle 50 to reverse the vehicle at a reversing point on the path toward the corresponding delivery destination or in the vicinity thereof (S23). Then, the processing unit 11 transmits an advancing instruction to a next delivery destination to the vehicle 50 after the inversion (S24). In accordance with such a reversing instruction and travel instruction, the pickup and delivery management server 10 causes the vehicle 50 to reverse at the reversing point as necessary, and causes a package to be delivered to the next delivery destination.

As another example of the vehicle control operation of the present embodiment, when the delivery destination or the pickup destination is positioned on a one-way road, the pickup and delivery management server 10 can perform delivery or pickup at a delivery destination or a pickup destination facing a right side of the road without reversing the vehicle 50. For example, when a package compartment that stores a target package is on the right side with respect to the delivery destination or the pickup destination facing the right side of the road, the pickup and delivery management server 10 causes the vehicle 50 to travel in the advancing direction as it is, and causes the vehicle 50 to be brought close to the right side of the road to arrive at the delivery destination or the pickup destination.

Figure 12:
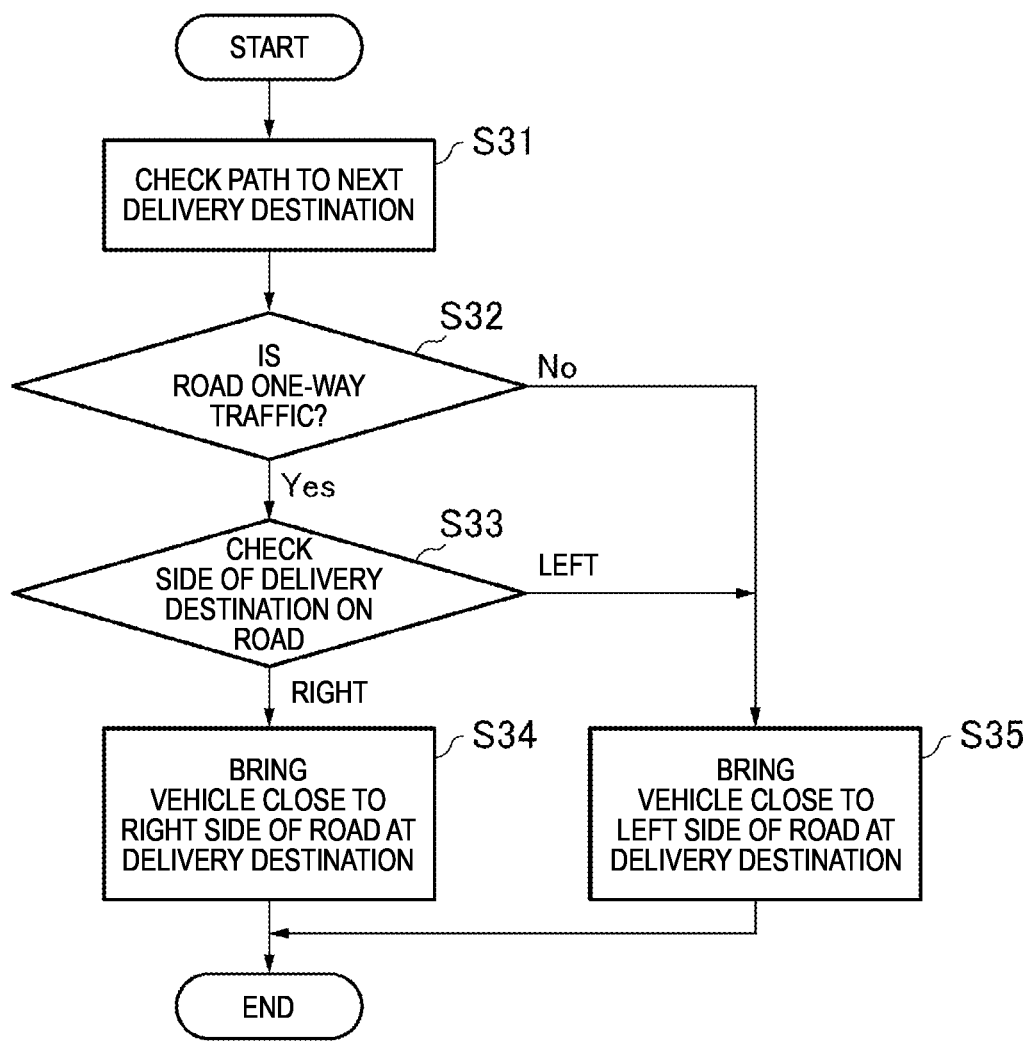
FIG. 12 is a flowchart showing a processing procedure of a travel instruction to the vehicle when the vehicle travels on a one-way road.

FIG. 12 is a flowchart showing a processing procedure of a travel instruction to the vehicle 50 when the vehicle travels on a one-way road. An example of FIG. 12 shows an example in which, when a package is delivered on a road of a traffic system of left-hand traffic, a travel instruction regarding a next delivery destination is issued. The processing of the travel instruction to the vehicle is mainly executed by the vehicle control unit 151 in the processing unit 11 of the pickup and delivery management server 10. The processing unit 11 of the pickup and delivery management server 10 acquires a position of a next delivery destination, a path to the delivery destination, and package compartment information of the vehicle, and checks the path to the next delivery destination (S31). Then, the processing unit 11 determines whether a road is one-way traffic based on information on a road facing the delivery destination (S32).

When the road is one-way traffic, the processing unit 11 checks a direction in which the delivery destination faces the road with respect to an advancing direction toward the next delivery destination (S33).

In a case where the next delivery destination is on the right side of the road, the processing unit 11 causes the vehicle to travel in the advancing direction as it is, and causes the vehicle 50 to arrive at the delivery destination by bringing the vehicle 50 close to the right side of the road (S34). On the other hand, in a case where the next delivery destination is on a left side of the road and in a case where the next delivery destination is not a one-way road, the processing unit 11 causes the vehicle to travel in the advancing direction as it is, and causes the vehicle 50 to arrive at the delivery destination by bringing the vehicle 50 close to the left side of the road, similar to the normal traveling to the delivery destination (S35). In a case where the direction in which the delivery destination faces the road and a package compartment that stores a package to be delivered are positioned on opposite sides with respect to the advancing direction toward the next delivery destination, the reversing operation is performed at a reversing point before the vehicle 50 enters the one-way road in accordance with the example of FIG. 11.

When the vehicle is simply parked on a road near the delivery destination or the pickup destination at the time of delivery or pickup of a package, there is a possibility that a package compartment that stores a target package addressed to a user is positioned on an opposite side (closer to a center) of the road as viewed from a house or the like at the target user point. On the contrary, in the present embodiment, by reversing the advancing direction of the vehicle in a case where a side of a target package compartment with respect to the advancing direction of the vehicle does not coincide with a side of the delivery destination or the pickup destination, for example, in a case of left-hand traffic, the side of the target package compartment can always be positioned on the left side to arrive at the delivery destination or the pickup destination. Further, for example, in a case of right-hand traffic, the side of the target package compartment can always be positioned on the right side to arrive at the delivery destination or the pickup destination. Accordingly, it is possible to park the vehicle while directing the target package compartment toward a side close to the user in delivery or pickup of the package, and it is possible to prevent the target package compartment of the vehicle from being on an opposite side of the road with respect to a target user point of the delivery destination or the pickup destination. Therefore, inconvenience at the time of taking out the package or depositing and taking out the package can be eliminated, and convenience for the user can be improved.

Second Embodiment

Figure 13:
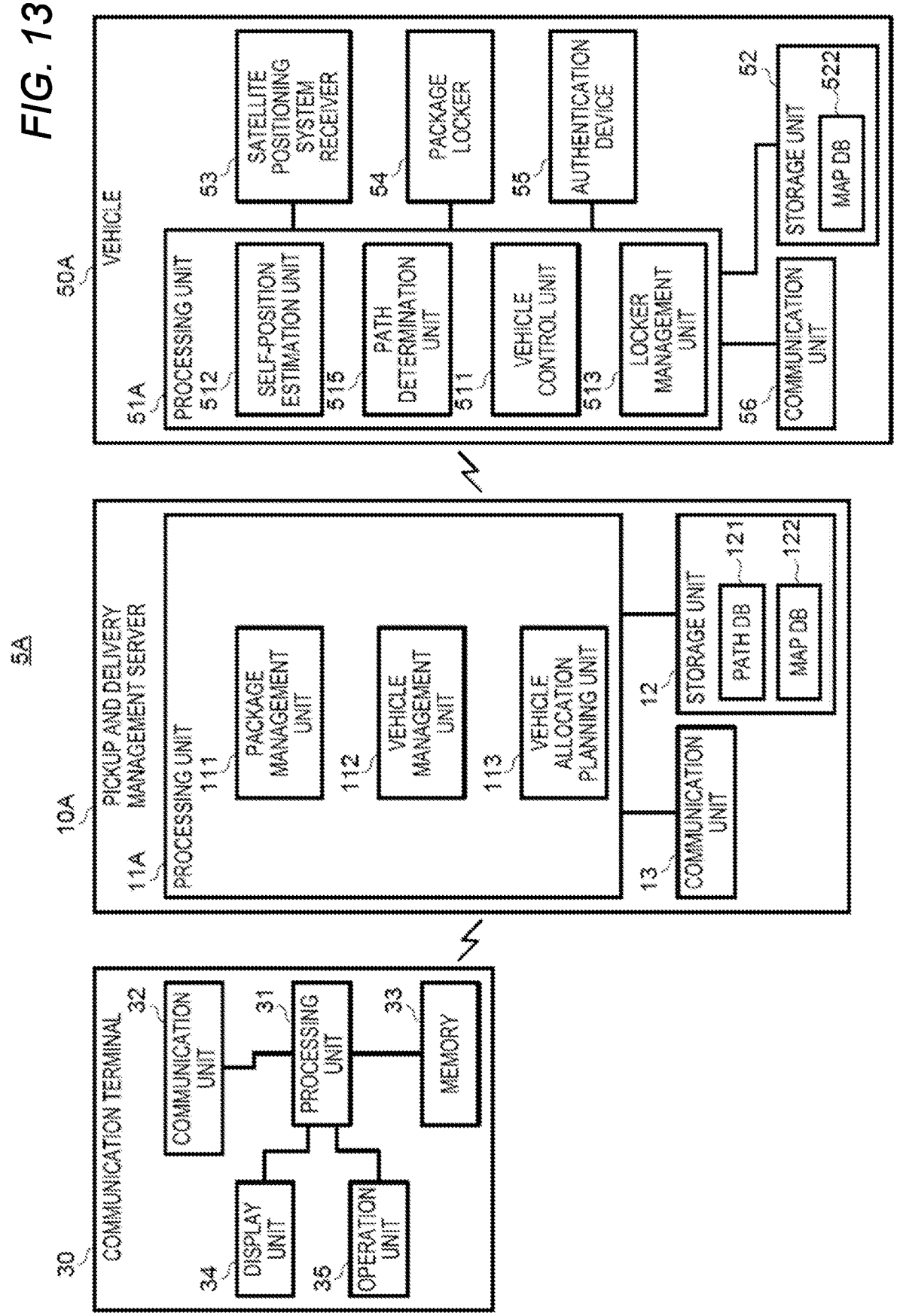
FIG. 13 is a block diagram showing an example of a configuration of a pickup and delivery system according to a second embodiment.

FIG. 13 is a block diagram showing an example of a configuration of a pickup and delivery system according to a second embodiment. A pickup and delivery system 5A includes a pickup and delivery management server 10A, the communication terminal 30, and a vehicle 50A. In the second embodiment, a case where the vehicle 50A has a function of a vehicle control device and the vehicle 50A itself mainly controls operation based on an instruction of the pickup and delivery management server 10A will be described as an example. The same components and functions as those of the first embodiment are denoted by the same reference numerals and description thereof will be omitted, and functions and operations different from those of the first embodiment will be mainly described here.

The pickup and delivery management server 10A is managed by an organization such as a company that operates a pickup and delivery system that delivers or picks up a package, and functions are realized by a server device on a network, a management computer disposed in a base such as a pickup and delivery center, or the like.

The pickup and delivery management server 10A includes a processing unit 11A, the storage unit 12, and the communication unit 13. The processing unit 11 includes a processor, and realizes various functions, for example, by the processor executing a predetermined program stored in the storage unit 12. The processor may include an MPU, a CPU, a DSP, a GPU, and the like.

The processing unit 11A includes the package management unit 111, the vehicle management unit 112, and the vehicle allocation planning unit 113 as functional configurations. The package management unit 111, the vehicle management unit 112, and the vehicle allocation planning unit 113 are functions obtained by the processor executing a predetermined program.

The vehicle 50A may be an unmanned autonomous driving electric automobile for picking up and delivering a package. The vehicle 50A includes a processing unit 51A, the storage unit 52, the satellite positioning system receiver 53, the package locker 54, the authentication device 55, and the communication unit 56.

The processing unit 51A includes a processor, and realizes various functions, for example, by the processor executing a predetermined program stored in the storage unit 52. The processor may include an MPU, a CPU, a DSP, a GPU, and the like. The processing unit 51A includes the vehicle control unit 511, a self-position estimation unit 512, the locker management unit 513, and a path determination unit 515 as functional configurations. The vehicle control unit 511, the self-position estimation unit 512, the locker management unit 513, and the path determination unit 515 are functions obtained by the processor executing a predetermined program.

The vehicle control unit 511 performs various vehicle controls such as detection control of various sensors, control of illumination and display, and the like, in addition to traveling control of a power source (a motor or an engine), steering, braking, and the like of the vehicle 50A, based on an instruction from the pickup and delivery management server 10A, a pickup and delivery route, a vehicle position, and the like. In the traveling control of the vehicle 50A, the vehicle control unit 151 performs control related to reversion during traveling.

The self-position estimation unit 512 estimates a position of the vehicle 50A. The self-position estimation unit 512 may calculate the position (a latitude, a longitude, and an altitude) of the vehicle 50A based on a radio signal received by the satellite positioning system receiver 53. The self-position estimation unit 512 may acquire the position of the vehicle 50A on a pickup and delivery route with reference to the map data 522. The self-position estimation unit 512 may calculate the position of the vehicle 50A by using various detection signals detected by the vehicle 50A. As a detection signal used for position estimation of the vehicle 50A, in addition to the radio signal from a satellite acquired by the satellite positioning system receiver 53, a beacon signal from each small transmitter (beacon) disposed on a road, a received electric field strength of a communication signal from a wireless LAN base station or a base station for mobile communication disposed at each place, and the like can be used.

The locker management unit 513 acquires storage states of packages in the package locker 54. The locker management unit 513 manages locking or unlocking of a door of the package locker 54. Further, the locker management unit 513 manages a package ID and package information (the number, a weight, a size, a content, and the like) of a package housed in the package locker 54.

The path determination unit 515 may acquire information of a vehicle allocation plan from the pickup and delivery management server 10A, determine an order of via-points and delivery destinations of the vehicle 50A in accordance with a delivery position or a pickup position, and set a pickup and delivery route. Further, the path determination unit 515 may determine whether the vehicle needs to be reversed and a reversing point of the vehicle in accordance with an advancing direction of the vehicle 50A and a loading position of a loaded package. The order of the via-points and the delivery destinations of the vehicle 50A may be input from, for example, an operator of the pickup and delivery management server 10A, or may be determined in accordance with a predetermined algorithm based on a delivery time, a delivery position, and the like.

The vehicle 50A may acquire the pickup and delivery route set in the pickup and delivery management server 10A. The vehicle control unit 511 and the path determination unit 515 may, in accordance with the pickup and delivery route, calculate a path related to delivery or pickup and perform operation control of the vehicle to a delivery destination or a pickup destination.

Next, an operation of traveling control related to delivery or pickup of a package in the second embodiment will be described.

Figure 14:
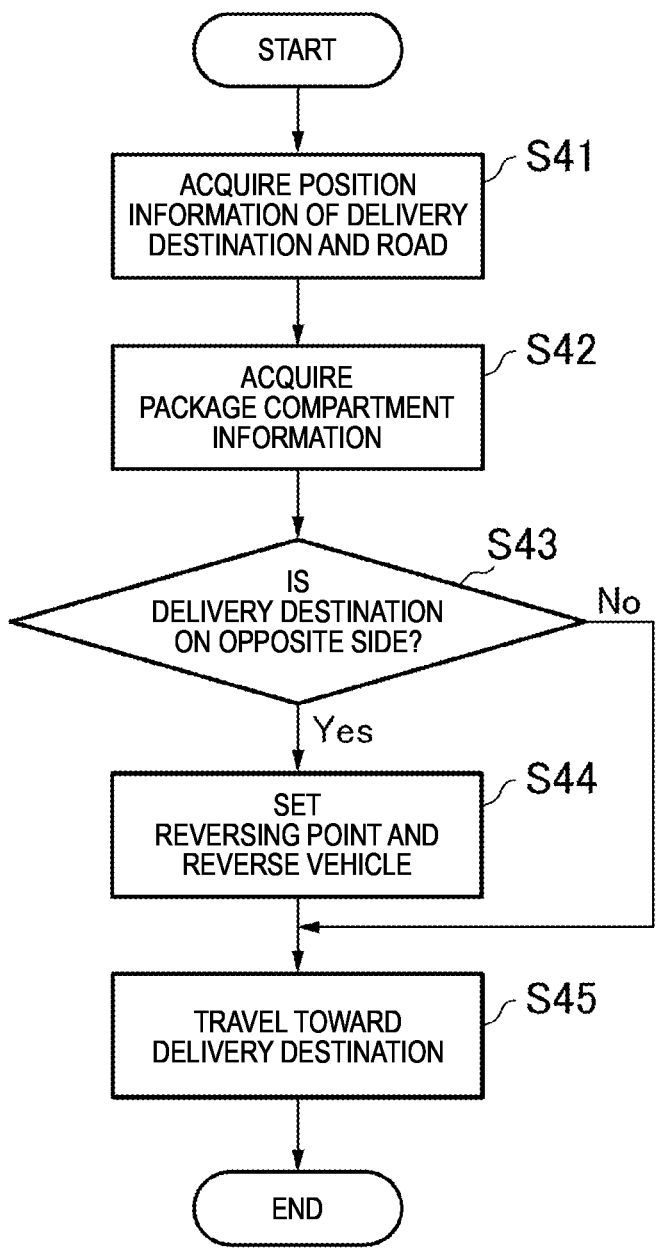
FIG. 14 is a flowchart showing a processing procedure of a travel instruction regarding a next destination point in the vehicle.

FIG. 14 is a flowchart showing a processing procedure of a travel instruction regarding a next destination point in the vehicle 50A. An example of FIG. 14 shows an example in which, when delivering packages to a plurality of delivery destinations, a travel instruction regarding a next delivery destination is issued. A processing of the travel instruction of the vehicle is mainly executed by the vehicle control unit 511 in the processing unit 51A of the vehicle 50A. The processing unit 51A of the vehicle 50A acquires positions of delivery destinations and road information of a pickup and delivery area including the positions of the delivery destinations (S41). Further, the processing unit 51A acquires, as package compartment information of packages stored in the vehicle 50A, package IDs of the packages and position information of package compartments that store the packages in the package locker 54 (S42). Then, the processing unit 51A calculates a path to a next delivery destination, and determines whether a direction in which a delivery destination faces a road and a package compartment that stores a package to be delivered are positioned on opposite sides with respect to an advancing direction of entering the next delivery destination (S43).

In a case where the package compartment that stores the package to be delivered is on an opposite side of a road direction of the next delivery destination with respect to the advancing direction of the vehicle, the processing unit 51A sets a reversing point on a path toward the corresponding delivery destination or in the vicinity thereof, and outputs a reversing instruction at the reversing point to perform a reversing operation of the vehicle 50A (S44). Then, in accordance with the reversed advancing direction, the processing unit 51A outputs an advancing instruction to the next delivery destination and the vehicle travels (S45). By such a reversing operation and a traveling operation, the vehicle 50A reverses the advancing direction at the reversing point as necessary and delivers the package to the next delivery destination.

As in the present embodiment, even in a case where the vehicle mainly performs the reversing operation, by reversing the advancing direction of the vehicle in a case where a side of a target package compartment with respect to the advancing direction of the vehicle does not coincide with a side of the delivery destination or the pickup destination, for example, in a case of left-hand traffic, the side of the target package compartment can always be positioned on the left side to arrive at the delivery destination or the pickup destination. Further, for example, in a case of right-hand traffic, the side of the target package compartment can always be positioned on the right side to arrive at the delivery destination or the pickup destination. Therefore, inconvenience at the time of taking out the package or depositing and taking out the package can be eliminated, and convenience for the user can be improved.

As described above, the vehicle control device of the present embodiment is a device that is provided in the pickup and delivery management server 10 or the vehicle 50A of the pickup and delivery system 5 or 5A and that performs control related to pickup and delivery of a package by a vehicle that can move forward bi-directionally. Further, the vehicle control method and the program according to the present embodiment are executed by the vehicle control device described above. The vehicle control device includes the processing unit 11 or 51A that provides an instruction on traveling of the vehicle. The vehicle 50 or 50A is configured to be able to move forward bi-directionally by reversing the advancing direction, includes the plurality of package compartments that store the packages, and includes the package compartments A11 to A33 on the first side where the opening portions of the package compartments face the first side surface (for example, the left side surface) of the vehicle, and the package compartments B11 to B33 on the second side where the opening portions of the package compartments face the second side surface (for example, the right side surface) on the side opposite to the first side surface. The processing unit 11 or 51A acquires the position information of the target user point (the delivery destination or the pickup destination) designated by the user who requests delivery or pickup and the position information of the target package compartment that stores the package to be delivered or picked up with respect to the advancing direction in which the vehicle travels toward the target user point. For example, the position information of the target user point with respect to the road, that is, the information of the side (the right side or the left side) of the target user point with respect to the advancing direction of the vehicle, and the information of the side (the right side or the left side) of the side surface where the target package compartment that stores the package to be delivered or picked up among the plurality of package compartments of the vehicle is positioned are acquired. In a case where the side of the side surface where the target package compartment is positioned does not coincide with the side of the target user point with respect to the advancing direction of the vehicle, the processing unit 11 or 51A outputs the instruction to reverse the advancing direction of the vehicle to the vehicle control unit 151 or 511 that performs the traveling control of the vehicle. That is, the processing unit 11 or 51A outputs the reversing instruction to the vehicle control unit 151 or 511 such that the advancing direction of the vehicle is reversed and the vehicle is directed to the target user point.

In the above configuration, in a case where the side of the target package compartment does not coincide with the road direction of the target user point, for example, in a case where the side of the target user point with respect to the advancing direction of the vehicle is the left side and the side of the side surface where the target package compartment for performing delivery or pickup is positioned is the right side on the road of the traffic system of left-hand traffic, the advancing direction of the vehicle is reversed. Further, for example, in a case where the side of the target user point with respect to the advancing direction of the vehicle is the right side and the side of the target package compartment for performing delivery or pickup is the left side on the road of the traffic system of right-hand traffic, the advancing direction of the vehicle is reversed. Accordingly, the side of the target package compartment is reversed and positioned on the left side, and the target package compartment can be positioned on a side close to the user in delivery or pickup of the package. Therefore, in the pickup and delivery system using the autonomous driving vehicle, it is possible to improve convenience at the time of delivery or pickup.

The processing unit 11 or 51A may calculate the path information of the pickup and delivery route including the path to the target user point for performing delivery or pickup of the package by the vehicle 50 or 50A, may output the calculated path information to the vehicle control unit 151 or 511, and may set a reversing point at which the advancing direction of the vehicle is reversed on the path in a case where the side of the target user point with respect to the advancing direction of the vehicle does not coincide with the side of the side surface where the target package compartment is positioned in the calculation of the path information. Accordingly, for example, when determining a pickup and delivery route for a pickup and delivery plan or the like, in a case where the side of the target package compartment does not coincide with the road direction of the target user point, and for example, in a case where the side of the target user point with respect to the advancing direction of the vehicle is the left side and the side of the target package compartment for performing delivery or pickup is the right side on the road of the traffic system of left-hand traffic, the path information can be calculated by setting the reversing point. Therefore, when delivering or picking up the package, the vehicle can be reversed at the reversing point to turn the advancing direction, and the target package compartment can be directed to and caused to arrive at the side close to the user, so that convenience can be improved.

In the calculation of the path information, the processing unit 11 or 51A may reverse the advancing direction of the vehicle after passing through all the target user points where the side of the target user point with respect to the advancing direction of the vehicle coincides with the side of the side surface where the target package compartment is positioned, and set the pickup and delivery route passing through the rest of the target user points. For example, a path of the pickup and delivery route may be set such that, on the road of the traffic system of left-hand traffic, all packages in package compartments on the left side are delivered or picked up at target user points on the left side with respect to the advancing direction of the vehicle, the advancing direction of the vehicle is reversed to turn sides of the rest of target package compartments to the left side, and packages in the rest of the target package compartments are delivered or picked up at the rest of target user points. Accordingly, the number of times of reversion of the advancing direction of the vehicle can be reduced (at least once), and the target package compartment can be directed to and caused to arrive at the side close to the user.

In the calculation of the path information, the processing unit 11 or 51A may adopt the shortest path passing through the target user points, and set the pickup and delivery route of reversing the advancing direction of the vehicle in front of a corresponding target user point in a case where the side of the target user point with respect to the advancing direction of the vehicle and the side of the side surface where the target package compartment is positioned do not coincide with each other. For example, on the road of the traffic system of left-hand traffic, a shortest route that minimizes a path cost may be set, and in a case where the side of the target user point with respect to the advancing direction of the vehicle is the left side and the side of the target package compartment for performing delivery or pickup is the right side, a path of the pickup and delivery route may be set such that the reversing point is set in front of the target user point and the vehicle is reversed. Accordingly, the path cost of the pickup and delivery route can be reduced, and the target package compartment can be directed to and caused to arrive at the side close to the user.

When the vehicle 50 or 50A travels to a next target user point in order to deliver or pick up the package, in a case where a side of the next target user point with respect to the advancing direction of the vehicle does not coincide with the side of the side surface where the target package compartment is positioned, the processing unit 11 or 51A may output an instruction to reverse the advancing direction of the vehicle to the vehicle control unit 151 or 511. For example, in a case where the side of the next target user point with respect to the advancing direction of the vehicle is the left side with respect to the advancing direction and the side of the target package compartment for performing delivery or pickup is the right side on the road of the traffic system of left-hand traffic, an instruction to reverse the advancing direction of the vehicle may be output. Accordingly, the advancing direction of the vehicle can be reversed on the path along which the vehicle travels toward the next target user point, and the target package compartment can be directed to and caused to arrive at the side close to the user.

When the vehicle 50 or 50A arrives at the target user point, the processing unit 11 or 51A may output, to the vehicle control unit 151 or 511, an instruction to bring a side surface of the vehicle close to a roadside facing the target user point and stop the vehicle. Accordingly, at the target user point of a destination, it is possible to bring the target package compartment close to a side of the user at the target user point to cause the target package compartment to arrive at the side of the user, and to improve convenience.

The processing unit 11 or 51A may acquire the road information of the pickup and delivery target area including the target user point. When a road facing the target user point is one-way traffic, with respect to a target user point at which the side of the target user point with respect to the advancing direction of the vehicle and the side of the side surface where the target package compartment is positioned coincide with each other, when the vehicle 50 or 50A arrives at the target user point, the processing unit 11 or 51A may output, to the vehicle control unit 151 or 511, an instruction to bring a right side surface of the vehicle close to a roadside on the right side facing the target user point and stop the vehicle in a case where the target user point is on a right side of the road with respect to the advancing direction, and may output, to the vehicle control unit 151 or 511, an instruction to bring a left side surface of the vehicle close to a roadside on the left side facing the target user point and stop the vehicle in a case where the target user point is on a left side of the road with respect to the advancing direction. Accordingly, in a case of the one-way road, it is possible to bring the target package compartment close to the side of the user at the target user point and cause the target package compartment to arrive at the side of the user at the target user point, such as a right side with respect to the target user point on the right side of the road and a left side with respect to the target user point on the left side of the road, and thus it is possible to improve convenience.

The target user point is a point designated by the user of the delivery destination to which the package is delivered. The processing unit 11 or 51A may check the side of the package compartment that stores the package to be delivered and the side of the target user point of the delivery destination with respect to the advancing direction in which the vehicle 50 or 50A travels toward the delivery destination, and may output an instruction to reverse the advancing direction of the vehicle 50 or 50A to the vehicle control unit 151 or 511 in a case where the side of the side surface where the target package compartment is positioned and the side of the target user point of the delivery destination with respect to the advancing direction of the vehicle do not coincide with each other. Accordingly, the target package compartment can be directed to and caused to arrive at the side close to the user when delivering the package, and thus convenience can be improved.

The target user point is a point designated by the user of the pickup destination for picking up the package. The processing unit 11 or 51A may check the side of the empty package compartment for storing the package to be picked up and the side of the target user point of the pickup destination with respect to the advancing direction in which the vehicle 50 or 50A travels toward the pickup destination, and may output an instruction to reverse the advancing direction of the vehicle 50 or 50A to the vehicle control unit 151 or 511 in a case where the side of the side surface where the target package compartment is positioned and the side of the target user point of the pickup destination with respect to the advancing direction of the vehicle do not coincide with each other. Accordingly, the target package compartment can be directed to and caused to arrive at the side close to the user when picking up the package, and thus convenience can be improved.

The processing unit 11 may be provided in the pickup and delivery management server 10 that is an example of a server device that manages operation of the vehicle 50. Accordingly, the reversing operation of the vehicle 50 can be comprehensively controlled and managed in the server device. The target package compartment can be directed to and caused to arrive at the side close to the user, and thus convenience can be improved.

The processing unit 51A and the vehicle control unit 511 may be provided in the vehicle 50A. Accordingly, the reversing operation of the vehicle can be controlled and managed by the vehicle 50A itself. The target package compartment can be directed to and caused to arrive at the side close to the user, and thus convenience can be improved.

The vehicle 50A of the present embodiment is a vehicle that can move forward bi-directionally, and includes the package compartments A11 to A33 on the first side where the opening portions of the package compartments face the first side surface (for example, the left side surface) of the vehicle 50A, and the package compartments B11 to B33 on the second side where the opening portions of the package compartments face the second side surface (for example, the right side surface) on the side opposite to the first side surface. The vehicle 50A includes the processing unit 51A that provides an instruction on traveling of the vehicle and performs control related to pickup and delivery of the package by the vehicle, and the vehicle control unit 511 that performs traveling control of the vehicle. The processing unit 51A acquires the position information of the target user point (the delivery destination or the pickup destination) designated by the user who requests delivery or pickup, and the position information of the target package compartment that stores the package to be delivered or picked up with respect to the advancing direction in which the vehicle travels toward the target user point. In a case where the side of the side surface where the target package compartment is positioned does not coincide with the side of the target user point with respect to the advancing direction of the vehicle, the processing unit 51A outputs an instruction to reverse the advancing direction of the vehicle 50A to the vehicle control unit 511. That is, the processing unit 51A outputs the reversing instruction to the vehicle control unit 511 such that the advancing direction of the vehicle is reversed and the vehicle is directed to the target user point. Accordingly, the reversing operation can be controlled and managed by the vehicle itself when performing delivery or pickup, the target package compartment can be directed to and caused to arrive at the side close to the user, and thus convenience can be improved.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in the various embodiments described above may be combined optionally in the range without deviating from the spirit of the invention.

The present application is based on Japanese Patent Application (Japanese Patent Application No. 2019-024569) filed on Feb. 14, 2019, and the contents of which are incorporated herein by reference.

The present disclosure has an effect of enabling a target package compartment to be positioned on a side close to a user in delivery or pickup of a package, and is useful as a vehicle control device, a vehicle control method, and a program in a pickup and delivery system or the like.

The invention claimed is:

1. A vehicle control device configured to perform control related to pickup and delivery by a vehicle, the vehicle being configured to be movable forward bi-directionally and comprising a first package compartment on a first side where a first opening portion of the first package compartment faces a first side surface of the vehicle, and a second package compartment on a second side where a second opening portion of the second package compartment faces a second side surface of the vehicle opposite to the first side surface, the vehicle control device comprising:
a processor; and
a memory including instructions that, when executed by the processer, cause the vehicle control device to perform operations, the operations comprising:

acquiring first position information of a target user point designated by a user who requests delivery or pickup;

acquiring second position information of a target package compartment for storing a package to be delivered or picked up with respect to an advancing direction in which the vehicle travels toward the target user point; and outputting a first instruction to reverse the advancing direction of the vehicle to a vehicle controller, the vehicle controller being configured to perform traveling control of the vehicle in a case where a side surface where the target package compartment is positioned does not face a side of a road where the target user point is located; and outputting a second instruction to stop, by bringing the side surface where the target package compartment is positioned close to the side of the road where the target user point is located, to the vehicle controller, wherein the advancing direction of the vehicle, which is reversed, comprises a first direction and a second direction opposite to the first direction, and wherein each of the first side surface and the second side surface is reversed in a left-right direction with respect to the advancing direction of the vehicle when the advancing direction is switched between the first direction and the second direction.

2. The vehicle control device according to claim 1, wherein the operations further comprise:

calculating path information of a pickup and delivery route, the pickup and delivery route comprising a path to the target user point for delivering or picking up the package by the vehicle; and outputting the path information to the vehicle controller, wherein the calculating of the path information comprises, in a case where the side of the road where the target user point does not face the side surface where the target package compartment is positioned, setting a reversing point on the path, the reversing point at which the advancing direction of the vehicle is to be reversed.

3. The vehicle control device according to claim 2, wherein a plurality of target user points comprising the target user point are designated, and wherein the calculating the path information comprises setting the pickup and delivery route in which the vehicle passes through all of first target user points that face the side surface where the target package compartment is positioned, thereafter the advancing direction of the vehicle is reversed, and then the vehicle passes through second target user points of the plurality of target user points other than the first target user points.

4. The vehicle control device according to claim 2, wherein a plurality of target user points comprising the target user point are designated, and wherein the calculating the path information comprises:

adopting a shortest path passing through the plurality of target user points; and setting the pickup and delivery route in which the advancing direction of the vehicle is reversed before the target user point of which the side with respect to the advancing direction of the vehicle that does not coincide with the side of face the side surface where the target package compartment is positioned.

5. The vehicle control device according to claim 2, wherein the reversing point comprises position information of a point having a vehicle reversing space.

6. The vehicle control device according to claim 2, wherein a plurality of target user points comprising the target user point are designated, and wherein the calculating the path information comprises:

acquiring road information comprising the plurality of target user points; and determining an order of the plurality of target user points based on position information of the plurality of target user points and the road information.

7. The vehicle control device according to claim 6, wherein the calculating the path information comprises:

recalculating the delivery path by changing the order of the target user points in accordance with at least one of a number of reversing points, a position of the reversing points, and a movement cost between the target user points.

8. The vehicle control device according to claim 1, wherein the first instruction to reverse the advancing direction of the vehicle is output to the vehicle controller when the vehicle travels to a next target user point in order to deliver or pick up the package and in a case where a side of the road where the next target user point is located does not face the side surface where the target package compartment is positioned.

9. The vehicle control device according to claim 1, wherein the second instruction instructs the vehicle controller to bring the side surface of the vehicle close to the side of the road the target user point is located and to stop the vehicle when the vehicle is arriving at the target user point.

10. The vehicle control device according to claim 1, wherein the operations further comprise:

acquiring road information of a pickup and delivery target area comprising the target user point; and in a case where a road facing the target user point is a one-way road, for a target user point at which the side of the target user point with respect to the advancing direction of the vehicle faces the side of the side surface where the target package compartment is positioned, when the vehicle is arriving at the target user point, outputting, to the vehicle controller, a third instruction to bring a right side surface of the vehicle close to a roadside on a right side facing the target user point and stop the vehicle if the target user point is on the right side of the road with respect to the advancing direction, and outputting, to the vehicle controller, a fourth instruction to bring a left side surface of the vehicle close to the roadside on a left side facing the target user point and stop the vehicle if the target user point is on the left side of the road with respect to the advancing direction.

11. The vehicle control device according to claim 10, wherein the first instruction to reverse the advancing direction of the vehicle is output before the vehicle enters the one-way road in a case where the side surface where the target package compartment is positioned does not face the side of the road where the target user point is located.

12. The vehicle control device according to claim 1,
wherein the target user point is a delivery destination to which the package is delivered, and
wherein the operations further comprise:
  checking a side of a package compartment that stores the package to be delivered and a side of the target user point of the delivery destination with respect to the advancing direction in which the vehicle travels toward the delivery destination; and
  determining whether the side surface where the target package compartment is positioned faces the side of the road where the target user point is located.

13. The vehicle control device according to claim 1,
wherein the target user point is a pickup destination for picking up the package, and
wherein the operations further comprise:
  checking a side of an empty package compartment for storing the package to be picked up and a side of the target user point of the pickup destination with respect to an advancing direction in which the vehicle travels toward the pickup destination; and
  determining whether the side surface where the target package compartment is positioned faces the side of the road where the target user point is located.

14. The vehicle control device according to claim 1, wherein the processor is provided in a server device configured to manage operation of the vehicle.

15. The vehicle control device according to claim 1, wherein the processor and the vehicle controller are provided in the vehicle.

16. The vehicle control device according to claim 1, wherein the vehicle is configured to switch the advancing direction to reverse the vehicle without changing an orientation of the vehicle.

17. A vehicle configured to be movable forward bi-directionally, the vehicle comprising:
  a first package compartment on a first side where a first opening portion of the first package compartment faces a first side surface of the vehicle;
  a second package compartment on a second side where a second opening portion of the second package compartment faces a second side surface of the vehicle opposite to the first side surface;
  a processor;
  a memory having instructions; and
  a vehicle controller configured to perform traveling control of the vehicle,
  wherein the instructions, when executed by the processor, cause the processor to perform operations, the operations comprising:
    acquiring first position information of a target user point designated by a user who requests delivery or pickup;
    acquiring second position information of a target package compartment for storing the package to be delivered or picked up with respect to an advancing direction in which the vehicle travels toward the target user point; and
    outputting a first instruction to reverse the advancing direction of the vehicle to the vehicle controller in a case where a side surface where the target package compartment is positioned does not face a side of the road where the target user point is located; and
    outputting a second instruction to stop, by bringing the side surface where the target package compartment is positioned close to the side of the road where the target user point is located, to the vehicle controller,
  wherein the advancing direction of the vehicle, which is reversed, comprises a first direction and a second direction opposite to the first direction, and
  wherein each of the first side surface and the second side surface is reversed in a left-right direction with respect to the advancing direction of the vehicle when the advancing direction is switched between the first direction and the second direction.

18. A vehicle control method for performing control related to pickup and delivery by a vehicle, the vehicle being configured to be movable forward bi-directionally and comprising a first package compartment on a first side where a first opening portion of the first package compartment faces a first side surface of the vehicle, and a second package compartment on a second side where a second opening portion of the second package compartment faces a second side surface of the vehicle on a side opposite to the first side surface, the vehicle control method comprising:
  acquiring first position information of a target user point designated by a user who requests delivery or pickup;
  acquiring second position information of a target package compartment for storing a package to be delivered or picked up with respect to an advancing direction in which the vehicle travels toward the target user point; and
  outputting a first instruction to reverse the advancing direction of the vehicle to a vehicle controller configured to perform traveling control of the vehicle in a case where a side surface where the target package compartment is positioned does not face a side of the road where the target user point is located; and
  outputting a second instruction to stop, by bringing the side surface where the target package compartment is positioned close to the side of the road where the target user point is located, to the vehicle controller,
  wherein the advancing direction of the vehicle, which is reversed, comprises a first direction and a second direction opposite to the first direction, and
  wherein each of the first side surface and the second side surface is reversed in a left-right direction with respect to the advancing direction of the vehicle when the advancing direction is switched between the first direction and the second direction.

19. A non-transitory computer readable medium storing a program for causing a computer to execute a vehicle control method for performing control related to pickup and delivery by a vehicle, the vehicle being configured to be movable forward bi-directionally and comprising a first package compartment on a first side where a first opening portion of the first package compartment faces a first side surface of the vehicle, and a second package compartment on a second side where a second opening portion of the second package compartment faces a second side surface of the vehicle on a side opposite to the first side surface, the vehicle control method comprising:
  acquiring first position information of a target user point designated by a user who requests delivery or pickup;
  acquiring second position information of a target package compartment for storing a package to be delivered or picked up with respect to an advancing direction in which the vehicle travels toward the target user point; and
  outputting a first instruction to reverse the advancing direction of the vehicle to a vehicle controller configured to perform traveling control of the vehicle in a case where a side surface where the target package compartment is positioned does not face a side of the road where the target user point is located; and outputting a second instruction to stop, by bringing the side surface where the target package compartment is positioned close to the side of the road where the target user point is located, to the vehicle controller, wherein the advancing direction of the vehicle, which is reversed, comprises a first direction and a second direction opposite to the first direction, and wherein each of the first side surface and the second side surface is reversed in a left-right direction with respect to the advancing direction of the vehicle when the advancing direction is switched between the first direction and the second direction.

\* \* \* \* \*